(12) United States Patent
Uemoto et al.

(10) Patent No.: US 11,623,275 B2
(45) Date of Patent: Apr. 11, 2023

(54) METHOD FOR PRODUCING SINTERED MEMBER, AND SINTERED MEMBER

(71) Applicant: SUMITOMO ELECTRIC SINTERED ALLOY, LTD., Okayama (JP)

(72) Inventors: Keiichi Uemoto, Okayama (JP); Tetsuya Hayashi, Okayama (JP); Tatsushi Yamamoto, Okayama (JP); Shunichi Yano, Okayama (JP)

(73) Assignee: SUMITOMO ELECTRIC SINTERED ALLOY, LTD., Okayama (JP)

( * ) Notice: Subject to any disclaimer, the term of this patent is extended or adjusted under 35 U.S.C. 154(b) by 78 days.

(21) Appl. No.: 17/051,398

(22) PCT Filed: May 17, 2019

(86) PCT No.: PCT/JP2019/019767
§ 371 (c)(1),
(2) Date: Oct. 28, 2020

(87) PCT Pub. No.: WO2019/225513
PCT Pub. Date: Nov. 28, 2019

(65) Prior Publication Data
US 2021/0129223 A1   May 6, 2021

(30) Foreign Application Priority Data
May 23, 2018   (WO) .................. PCT/JP2018/019912

(51) Int. Cl.
*B22F 3/16* (2006.01)
*B22F 3/24* (2006.01)
(Continued)

(52) U.S. Cl.
CPC .................. *B22F 3/16* (2013.01); *B22F 3/24* (2013.01); *C22C 33/02* (2013.01); *C22C 38/16* (2013.01);
(Continued)

(58) Field of Classification Search
None
See application file for complete search history.

(56) References Cited

U.S. PATENT DOCUMENTS 5,625,861 A   4/1997  Nishi
5,841,041 A   11/1998 Asano
(Continued)

FOREIGN PATENT DOCUMENTS

CN   101733400 A   6/2010
JP   H8-218102 A   8/1996
(Continued)

OTHER PUBLICATIONS

International Search Report for corresponding Application No. PCT/JP2019/019767, dated Jul. 9, 2019.

*Primary Examiner* — Elizabeth Collister
(74) *Attorney, Agent, or Firm* — Renner, Otto, Boisselle & Sklar, LLP

(57) ABSTRACT

A method for producing a sintered member, including the steps of: preparing a raw powder; press-forming the raw powder to produce a green compact; and sintering the green compact by high-frequency induction heating, wherein a temperature of the green compact in the sintering step is controlled to satisfy all the following conditions (I) to (III): (I) the temperature is increased without maintaining the temperature in a temperature range equal to or higher than an $A_1$ point of an Fe—C phase diagram and lower than the sintering temperature of the green compact, (II) a heating rate is set to 12° C./s or more in a temperature range of the
(Continued)

$A_1$ point to an $A_3$ point of the Fe—C phase diagram, and (III) a heating rate is set to 4° C./s or more in a temperature range of the $A_3$ point of the Fe—C phase diagram to the sintering temperature of the green compact.

11 Claims, 12 Drawing Sheets

(51) Int. Cl.
   *C22C 33/02*     (2006.01)
   *C22C 38/16*     (2006.01)
(52) U.S. Cl.
   CPC ..... *B22F 2003/248* (2013.01); *B22F 2301/35* (2013.01)

(56) References Cited

U.S. PATENT DOCUMENTS

| | | |
|---|---|---|
| 2008/0233421 A1 | 9/2008 | Tanino |
| 2010/0116088 A1 | 5/2010 | Sato et al. |
| 2011/0206551 A1 | 8/2011 | Kondoh et al. |
| 2021/0162499 A1* | 6/2021 | Ishimine ................. B22F 3/162 |

FOREIGN PATENT DOCUMENTS

| | | |
|---|---|---|
| JP | H9-85389 A | 3/1997 |
| JP | 2000-170768 A | 6/2000 |
| JP | 2008-231538 A | 10/2008 |
| JP | 2014-227561 A | 12/2014 |
| JP | 2015-117391 A | 6/2015 |
| JP | 2017-9227 A | 1/2017 |

* cited by examiner

100 μm

100 μm

100 μm

100 μm

1 μm

1 μm

1 μm

1 μm

1 μm

METHOD FOR PRODUCING SINTERED MEMBER, AND SINTERED MEMBER

TECHNICAL FIELD

The present disclosure relates to a method for producing a sintered member and to the sintered member.

The present application claims the priority of the international application PCT/JP2018/019912, filed May 23, 2018, which is incorporated herein by reference in its entirety.

BACKGROUND ART

Iron sintered members for use in parts of automobiles and parts of general machinery are produced in a continuous mesh-belt sintering furnace, for example, as described in Patent Literature 1. A continuous mesh-belt sintering furnace includes a preheating unit, a sintering unit, and a cooling unit in this order from the upstream to the downstream. In the continuous mesh-belt sintering furnace, a pulley is rotated to drive a mesh belt and transfer a piece of work placed on the mesh belt to the preheating unit, the sintering unit, and the cooling unit in this order.

CITATION LIST

Patent Literature

PTL 1: Japanese Unexamined Patent Application Publication No. 2017-9227

SUMMARY OF INVENTION

Solution to Problem

A method for producing a sintered member according to the present disclosure includes the steps of:

preparing a raw powder containing an Fe powder or an Fe alloy powder and containing a C powder;

press-forming the raw powder to produce a green compact; and sintering the green compact by high-frequency induction heating, wherein a C powder content of the raw powder is 0.2% or more by mass and 1.2% or less by mass, and a temperature of the green compact in the step of sintering the green compact is controlled to satisfy all the following conditions (I) to (III):

(I) the temperature is increased without maintaining the temperature in a temperature range equal to or higher than an $A_1$ point of an Fe—C phase diagram and lower than the sintering temperature of the green compact, (II) the heating rate is set to 12° C./s or more in a temperature range of the $A_1$ point to an $A_3$ point of the Fe—C phase diagram, and (III) the heating rate is set to 4° C./s or more in a temperature range of the $A_3$ point of the Fe—C phase diagram to the sintering temperature of the green compact.

A sintered member according to the present disclosure is a sintered member with a composition including an Fe alloy containing C, wherein voids in a cross section of the sintered member have a sphericity of 50% or more and 85% or less, the sphericity being represented by [{area of void/(perimeter of void)$^2$}/0.0796]×100.

DESCRIPTION OF EMBODIMENTS

Figure 1:
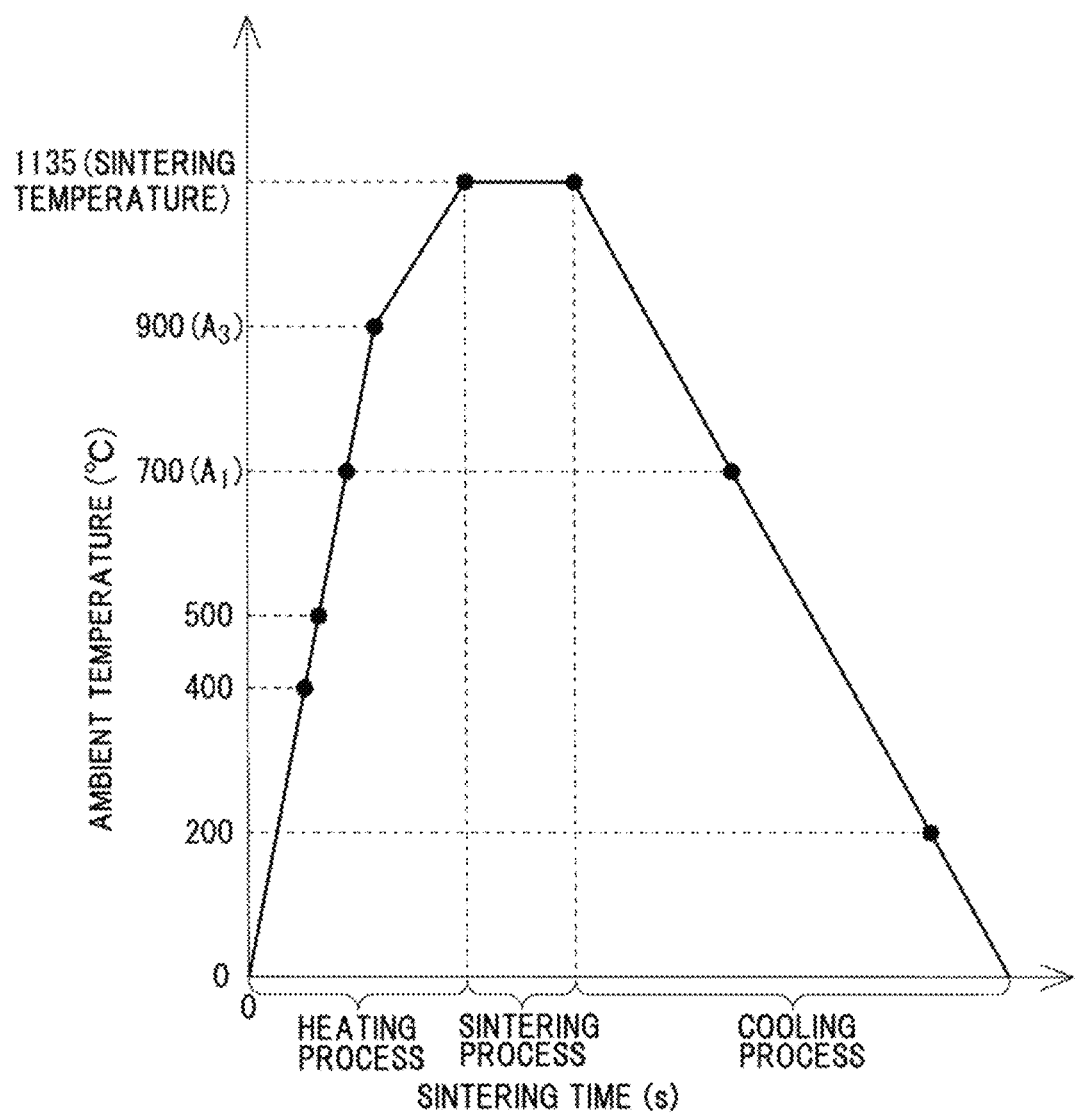
FIG. 1 is a graph of a temperature profile of a sintered member according to a sample No. 1 in the sintering step.

Problems to be Solved by Present Disclosure

There is a demand for a sintered member with improved productivity as well as further improved strength. Continuous belt sintering furnaces take a long time to produce sintered members. This is because it takes a long time to heat a sintering furnace to a specified temperature before sintering due to a low heating rate, and it also takes a long time to heat a green compact to a specified temperature for sintering.

Furthermore, continuous belt sintering furnaces tend to have a large size and require a large space. This is because continuous belt sintering furnaces require a long total length due to the low heating rate. Furthermore, continuous belt sintering furnaces consume enormous energy. This is because it takes a long time to produce sintered members. Furthermore, after a sintering furnace is heated to a specified temperature, the sintering furnace is sometimes maintained at the temperature while a green compact is not sintered. Temporarily cooling a sintering furnace while a green compact is not sintered and reheating the sintering furnace to the specified temperature take a long time and may decrease work efficiency.

Accordingly, it is an object of the present disclosure to provide a method for producing a high-strength sintered member in a short time.

It is another object of the present disclosure to provide a high-strength sintered member.

Advantageous Effects of Present Disclosure

A high-strength sintered member can be produced in a short time by a method for producing a sintered member according to the present disclosure.

A sintered member according to the present disclosure has high strength.

Description of Embodiments of Present Disclosure

First, embodiments of the present disclosure are described below.

(1) A method for producing a sintered member according to an embodiment of the present disclosure includes the steps of:

preparing a raw powder containing an Fe powder or an Fe alloy powder and containing a C powder;

press-forming the raw powder to produce a green compact; and sintering the green compact by high-frequency induction heating, wherein a C powder content of the raw powder is 0.2% or more by mass and 1.2% or less by mass, and a temperature of the green compact in the step of sintering the green compact is controlled to satisfy all the following conditions (I) to (III):

(I) the temperature is increased without maintaining the temperature in a temperature range equal to or higher than an $A_1$ point of an Fe—C phase diagram and lower than the sintering temperature of the green compact, (II) the heating rate is set to 12° C./s or more in a temperature range of the $A_1$ point to an $A_3$ point of the Fe—C phase diagram, and (III) the heating rate is set to 4° C./s or more in a temperature range of the $A_3$ point of the Fe—C phase diagram to the sintering temperature of the green compact.

This embodiment can produce a high-strength sintered member in a short time.

The reason for the short production time is that the high-frequency induction heating enables high-speed heating. Thus, the high-frequency induction heating can heat a green compact to a specified temperature in a shorter time than continuous belt sintering furnaces. Furthermore, unlike continuous belt sintering furnaces, the high-frequency induction heating does not need to heat a main body of a sintering furnace.

The high strength of the sintered member is probably due to the following reason. Although C diffuses easily into Fe due to high temperature in the temperature range of the condition (I), not maintaining the temperature in this temperature range and increasing the heating rate as in the conditions (II) and (III) potentially prevent the diffusion of C into Fe. Slower diffusion of C results in a residual C-rich phase (or C phase) on the surface of Fe, and the C-rich phase becomes an Fe—C liquid phase at the sintering temperature. Thus, high-speed heating without maintaining the temperature in a temperature range in which C diffuses easily into Fe tends to result in the formation of an Fe—C liquid phase. The Fe—C liquid phase rounds edges of voids between particles and decreases the number of sharp portions of voids responsible for a decrease in strength. This can increase the strength, particularly radial crushing strength, of the sintered member.

The present embodiment can more easily decrease the size of equipment than continuous belt sintering furnaces. This is because the high-speed heating obviates the need for long sintering furnaces, such as continuous belt sintering furnaces. Furthermore, the present embodiment can more easily decrease the power consumption than continuous belt sintering furnaces. This is due to the shorter production time and because, unlike continuous belt sintering furnaces, there is no need to maintain the temperature of the sintering furnace.

(2) In one embodiment of the method for producing a sintered member, the raw powder further contains 0.1% or more by mass and 3.0% or less by mass Cu powder.

This embodiment can produce a high-strength sintered member. A solid solution of Cu in Fe can increase strength, and a Cu powder in this content range can effectively increase strength.

(3) In one embodiment of the method for producing a sintered member, the holding time at the sintering temperature of the green compact is 30 seconds or more and 90 seconds or less.

When the holding time is 30 seconds or more, the green compact can be sufficiently heated, and a high-strength sintered member can be easily produced. When the holding time is 90 seconds or less, a sintered member can be produced in a short time due to the short holding time.

(4) In one embodiment of the method for producing a sintered member, the ambient temperature during sintering of the green compact is 1135° C. or more and less than 1250° C.

When the ambient temperature during sintering of the green compact is 1135 seconds or more, the green compact can be sufficiently heated, and a high-strength sintered member can be easily produced. When the ambient temperature during sintering of the green compact is less than 1250° C., an excessively high temperature and excessive formation of a liquid phase can be prevented, and a sintered member with high dimensional accuracy can be easily produced.

(5) In one embodiment of the method for producing a sintered member, the heating rate is set to 12° C./s or more in an ambient temperature range of 400° C. or more and less than 700° C. without maintaining the ambient temperature in a heating process in the step of sintering the green compact.

This embodiment can produce a high-strength sintered member in a shorter time than the case where the ambient temperature is maintained.

(6) In one embodiment of the method for producing a sintered member, an ambient temperature of 400° C. or more and less than 700° C. is maintained for 30 seconds or more and 90 seconds or less in a heating process in the step of sintering the green compact.

This embodiment can easily uniformly heat the green compact. Thus, the present embodiment is suitable to sinter a large green compact, for example. A high-strength sintered member can also be produced by maintaining the above ambient temperature for the above time.

(7) In one embodiment of the method for producing a sintered member, the cooling rate in a cooling process in the step of sintering the green compact is 1° C./s or more.

This embodiment can easily increase the strength. A cooling rate of 1° C./s or more can result in rapid cooling. Thus, the present embodiment can easily form a bainite structure in addition to a pearlite structure. A martensite structure can also be easily formed.

(8) A sintered member according to one embodiment of the present disclosure is a sintered member with a composition including an Fe alloy containing C, wherein voids in a cross section of the sintered member have a sphericity of 50% or more and 85% or less, the sphericity being represented by [{area of void/(perimeter of void)$^2$}/0.0796]×100.

In this embodiment, the voids in the sintered member have a somewhat round shape and round edges. This results in high strength (radial crushing strength) due to fewer sharp portions of the voids that act as origins of fracture and decrease the strength.

(9) In one embodiment of the sintered member, the composition further contains Cu, and an area analysis of a cross section of the sintered member with an electron probe microanalyzer at an accelerating voltage of 15 kV, at a beam current of 100 nA, and at a beam diameter of 0.1 μm for an analysis time of 3 hours shows that a ratio ($\alpha/\beta$)×100 is 40% or more, wherein $\alpha$ denotes a total area of a region with a Cu concentration level of 0.4 or more and 0.65 or less times a maximum Cu concentration level, and $\beta$ denotes a total area of a region with a Cu concentration level of 0.16 or more times the maximum Cu concentration level.

This embodiment has high strength due to a large diffusion area ratio of Cu in Fe.

(10) In one embodiment of the sintered member, the sintered member has a pearlite structure in which cementite and ferrite are layered, the cementite has a width of 120 nm or less, and the distance between adjacent portions of the cementite is 250 nm or less.

This embodiment has a fine pearlite structure and therefore has high strength.

(11) In one embodiment of the sintered member, the sintered member has a pearlite structure in which cementite and ferrite are layered, the composition further contains Cu, an area analysis of a cross section of the sintered member with an electron probe microanalyzer at an accelerating voltage of 15 kV, at a beam current of 100 nA, and at a beam diameter of 0.1 μm for an analysis time of 3 hours shows that a ratio ($\alpha/\beta$)×100 is 40% or more, wherein $\alpha$ denotes a total area of a region with a Cu concentration level of 0.4 or more and 0.65 or less times a maximum Cu concentration level, and $\beta$ denotes a total area of a region with a Cu concentration level of 0.16 or more times the maximum Cu concentration level, the cementite has a width of 120 nm or less, and the distance between adjacent portions of the cementite is 250 nm or less.

This embodiment has high strength. This is due to a large diffusion area ratio of Cu in Fe. This is also due to a fine pearlite structure.

Details of Embodiments of Present Disclosure

Embodiments of the present disclosure are described in detail below. These embodiments describe a method for producing a sintered member and then the sintered member.

[Method for Producing Sintered Member]

A method for producing a sintered member according to an embodiment includes the step of preparing a raw powder of a sintered member (hereinafter referred to as a preparing step), the step of press-forming the raw powder to form a green compact (hereinafter referred to as a forming step), and the step of sintering the green compact by high-frequency induction heating (hereinafter referred to as a sintering step). One feature of this method for producing a sintered member is that a particular raw powder is prepared in the preparing step and is sintered under specific conditions in the sintering step. These steps are described in detail below.

[Preparing Step]

The preparing step includes preparing a raw powder containing an Fe powder or an Fe alloy powder and containing a C powder. The raw powder is composed mainly of the Fe powder or the Fe alloy powder. The Fe powder and the Fe alloy powder are hereinafter sometimes collectively referred to as an Fe-based powder.

(Fe Powder and Fe Alloy Powder)

The Fe powder is a pure iron powder. The Fe alloy powder is composed mainly of iron and contains Fe alloy particles containing one or more additive elements selected from the group consisting of Ni and Mo, for example. The Fe alloy may contain incidental impurities. A specific example of the Fe alloy is an Fe—Ni—Mo alloy. The Fe-based powder may be a water atomized powder, a gas atomized powder, a carbonyl powder, or a reduced powder. The Fe-based powder content of the raw powder may be 90% or more by mass or 95% or more by mass of the raw powder. The Fe content of the Fe alloy may be 90% or more by mass or 95% or more by mass of the Fe alloy. The total additive element content of the Fe alloy may be more than 0% by mass and 10.0% or less by mass or 0.1% or more by mass and 5.0% or less by mass.

The Fe-based powder may have an average particle size of 50 μm or more and 150 μm or less. An Fe-based powder with an average particle size in this range is easy to handle and is easy to press-form. An Fe-based powder with an average particle size of 50 μm or more can easily have high flowability. An Fe-based powder with an average particle size of 150 μm or less can easily form a sintered member with a dense structure. The Fe-based powder may also have an average particle size of 55 μm or more and 100 μm or less. The "average particle size" refers to the particle size at which the cumulative volume is 50% in a volumetric particle size distribution measured with a laser diffraction particle size distribution analyzer (D50). This also applies to the average particle size of a C powder and a Cu powder described below.

(C Powder)

A C powder becomes an Fe—C liquid phase during heating, rounds edges of voids in the sintered member, and improves the strength (radial crushing strength) of the sintered member. The C powder content of the raw powder may be 0.2% or more by mass and 1.2% or less by mass of the raw powder. A C powder content of 0.2% or more by mass tends to result in sufficient formation of the Fe—C liquid phase, effectively rounded edges of voids, and improved strength. AC powder content of 1.2% or less by mass tends to result in the suppression of excessive formation of the Fe—C liquid phase and the production of a sintered member with high dimensional accuracy. The C powder content is preferably 0.4% or more by mass and 1.0% or less by mass, particularly preferably 0.6% or more by mass and 0.8% or less by mass. The C powder preferably has a smaller average particle size than the Fe-based powder. The C powder smaller than the Fe-based powder tends to be uniformly dispersed between Fe-based particles and promote alloying. The C powder may have an average particle size of 1 μm or more and 30 μm or less or 10 μm or more and 25 μm or less. Although the C powder preferably has a larger average particle size to form the Fe—C liquid phase, an excessively large average particle size results in slow formation of the liquid phase and excessively large voids, which become defects. When the raw powder contains a pure iron powder but does not contain C, a sintered member produced by the production method according to the present embodiment has lower strength than sintered members produced by using continuous belt sintering furnaces.

(Cu Powder)

The raw powder preferably further contains a Cu powder. The Cu powder contributes to the formation of the Fe—C liquid phase during heating in the sintering step described later. Furthermore, a solid solution of Cu in Fe can increase strength, and the Cu powder can increase the strength of the sintered member. The Cu powder content of the raw powder may be 0.1% or more by mass and 3.0% or less by mass of the raw powder. A Cu powder content of 0.1% or more by mass tends to result in the formation of the Fe—C liquid phase. This is because the diffusion of Cu into Fe during heating (sintering) can easily suppress the diffusion of C into Fe. A Cu powder content of 3.0% or less by mass tends to result in the production of a sintered member with high dimensional accuracy. This is because the diffusion of Cu into Fe during heating (sintering) expands Fe particles and compensates for shrinkage during sintering. The Cu powder content may be 1.5% or more by mass and 2.5% or less by mass. Like the C powder, the Cu powder preferably has a smaller average particle size than the Fe-based powder. The Cu powder smaller than the Fe-based powder tends to be uniformly dispersed between Fe-based particles and promote alloying. The Cu powder may have an average particle size of 1 μm or more and 30 μm or less or 10 μm or more and 25 μm or less.

(Others)

The raw powder may contain a lubricant. The lubricant improves lubricity and formability in the forming of the raw powder. The lubricant may be a higher fatty acid, metallic soap, fatty acid amide, or higher fatty acid amide. The metallic soap may be zinc stearate or lithium stearate. The fatty acid amide may be stearamide, lauramide, or palmitamide. The higher fatty acid amide may be ethylenebis(stearamide). The lubricant may be of any form, such as a solid, powder, or liquid form. These lubricants may be used alone or in combination. The lubricant content of the raw powder may be 0.1% or more by mass and 2.0% or less by mass, 0.3% or more by mass and 1.5% or less by mass, particularly 0.5% or more by mass and 1.0% or less by mass, of the raw powder.

The raw powder may contain an organic binder. The organic binder may be polyethylene, polypropylene, poly(methyl methacrylate), polystyrene, poly(vinyl chloride), poly(vinylidene chloride), polyamide, polyester, polyether, poly(vinyl alcohol), vinyl acetate, paraffin, or wax. The organic binder content may be 0.1% or less by mass of the raw powder. An organic binder content of 0.1% or less by mass tends to result in a compact with a high metal powder content and a dense green compact. For the raw powder containing no organic binder, the green compact does not need to be degreased in a downstream step.

[Forming Step]

In the forming step, the raw powder is press-formed to produce a green compact. The green compact may have the final shape of the sintered member, more specifically columnar or cylindrical. The green compact with such a shape may be formed with a forming apparatus (mold). For example, a uniaxial press mold for use in press forming in the axial direction of a column or cylinder may be used. A higher forming pressure results in a green compact with a higher density and consequently a reinforced sintered member. The forming pressure may be 400 MPa or more, 500 MPa or more, particularly 600 MPa or more. The upper limit of the forming pressure may be, but is not limited to, 2000 MPa or less, 1000 MPa or less, particularly 900 MPa or less. The green compact may be subjected to cutting, as required. The cutting may be known processing.

[Sintering Step]

In the sintering step, the green compact is heated to produce a sintered member. High-frequency induction heating is used for the heating. The high-frequency induction heating enables high-speed heating and can heat the green compact to a specified temperature in a short time. Thus, the high-frequency induction heating can easily produce the sintered member in a short time. Direct electrical heating may also be used for the heating. A high-frequency induction heater (not shown) may be used for high-frequency induction heating. The high-frequency induction heater includes a power supply that can control the output and frequency, a coil coupled to the power supply, and a storage container that is located in the coil and houses the green compact. The high-frequency induction heater preferably further includes a gas supply line for supplying an inert gas to the storage container and a gas discharge line for discharging gas from the storage container. The high-frequency induction heater including the gas supply line and the gas discharge line can sinter the green compact in a nonoxidizing atmosphere. The inert gas may be nitrogen gas or argon gas. The sintering step includes a heating process, a sintering process, and a cooling process in this order.

(Heating Process)

The temperature of the green compact in the heating process is controlled to satisfy all the following conditions (I) to (III). The $A_1$ point is approximately 738° C., and the $A_3$ point is approximately 910° C.

(I) The temperature is increased without maintaining the temperature in a temperature range equal to or higher than the $A_1$ point of an Fe—C phase diagram and lower than the sintering temperature of the green compact, (II) the heating rate is set to 12° C./s or more in a temperature range of the $A_1$ point to the $A_3$ point of the Fe—C phase diagram, and (III) the heating rate is set to 4° C./s or more in a temperature range of the $A_3$ point of the Fe—C phase diagram to the sintering temperature of the green compact.

Temperature control to satisfy the conditions (I) to (III) satisfies the following conditions (i) to (iii). This is because the conditions (I) to (III) correlate substantially with the conditions (i) to (iii). In other words, temperature control to satisfy the conditions (i) to (iii) satisfies the conditions (I) to (III).

(i) The ambient temperature is increased without being maintained in an ambient temperature range corresponding to a temperature range equal to or higher than the $A_1$ point of the Fe—C phase diagram and lower than the sintering temperature of the green compact, (ii) the heating rate is set to 12° C./s or more in an ambient temperature range corresponding to the $A_1$ point to the $A_3$ point of the Fe—C phase diagram, and (iii) the heating rate is set to 4° C./s or more in an ambient temperature range corresponding to the $A_3$ point of the Fe—C phase diagram to the sintering temperature of the green compact.

The ambient temperature is the temperature of the atmosphere in the storage container and is the temperature measured with a thermocouple (diameter: Φ3.5 mm) separated 8.5 mm or less from the green compact. Because the atmosphere in the storage container is heated by the heat of the induction-heated green compact, the ambient temperature is often slightly lower than the temperature of the induction-heated green compact. For example, the ambient temperature corresponding to the $A_1$ point is the temperature of the atmosphere at the point in time when the temperature of the green compact reaches the $A_1$ point and is often equal to or lower than the $A_1$ point. The same is true for the ambient temperature corresponding to the $A_3$ point and the ambient temperature corresponding to the sintering temperature of the green compact.

A high-strength sintered member can be produced by satisfying all the conditions (I) to (III) (all the conditions (i) to (iii)). This is probably because although C diffuses easily into Fe in the temperature range of the condition (I), not maintaining the temperature in this temperature range and increasing the heating rate as in the conditions (II) and (III) potentially prevent the diffusion of C into Fe. The prevented diffusion of C results in a residual solid phase of C particles adjacent to Fe particles, for example, and a C-rich phase (or C phase) is formed at interfaces between the Fe particles and the C particles. The residual C-rich phase on the surface of Fe becomes an Fe—C liquid phase at the sintering temperature. As is clear from the Fe—C phase diagram, approximately 0.2% or more by mass C results in a liquid phase of an Fe—C material at 1153° C. or more. Thus, heating the green compact to a sintering temperature of 1153° C. or more converts the C-rich phase to a liquid phase. Thus, a high-speed heating without maintaining the temperature in a temperature range in which C diffuses easily into Fe tends to result in the formation of an Fe—C liquid phase. The Fe—C liquid phase rounds edges of voids between particles and decreases the number of sharp portions of voids responsible for a decrease in strength (origins of fracture). This can increase the strength, particularly radial crushing strength, of the sintered member.

The heating rate can be controlled by adjusting the output or frequency of the power supply in the high-frequency induction heater. The output or frequency setting may be the output or frequency setting that satisfy the heating rate of the condition (II). The output or frequency setting may be maintained from the temperature range of the condition (II) to the temperature range of the condition (III) or may be changed when the temperature range of the condition (II) is shifted to the temperature range of the condition (III). Maintaining the output or frequency setting from the temperature range of the condition (II) to the temperature range of the condition (III) can satisfy the heating rate of the condition (III). Maintaining the output or frequency, however, results in the heating rate of the condition (III) lower than the heating rate of the condition (II). Changing the output or frequency setting when the temperature range of the condition (II) is shifted to the temperature range of the condition (III) can further increase the heating rate of the condition (III) possibly to the heating rate comparable to that of the condition (II).

A higher heating rate of the condition (II), for example, 12.5° C./s or more, is preferred. The upper limit of the heating rate of the condition (II) may be 50° C./s or less, preferably 15° C./s or less. As in the condition (II), the heating rate of the condition (III) is preferably as high as possible and is preferably 5° C./s or more, more preferably 10° C./s or more, for example. The upper limit of the heating rate of the condition (III) may be 50° C./s or less, preferably 15° C./s or less.

In the heating process, the temperature of the green compact is preferably controlled to satisfy the condition (IV) or (V):

(IV) The green compact does not maintain a temperature in a temperature range of 410° C. or more and less than the $A_1$ point of the Fe—C phase diagram, and the heating rate in this temperature range is 12° C./s or more.

(V) The green compact maintains a temperature in a temperature range of 410° C. or more and less than the $A_1$ point of the Fe—C phase diagram for 30 seconds or more and 90 seconds or less.

Temperature control to satisfy the condition (IV) or (V) satisfies the following condition (iv) or (v). This is because the conditions (IV) and (V) correlate substantially with the conditions (iv) and (v). In other words, temperature control to satisfy the condition (iv) or (v) satisfies the condition (IV) or (V).

(iv) The heating rate is set to 12° C./s or more in an ambient temperature range of 400° C. or more and less than 700° C. without maintaining the ambient temperature.

(v) The ambient temperature of 400° C. or more and less than 700° C. is maintained for 30 seconds or more and 90 seconds or less.

Satisfying the condition (IV) or (iv) can result in the production of a high-strength sintered member in a shorter time than satisfying the condition (V) or (v). The output or frequency setting for the heating rate of the condition (IV) or (iv) can be the same as the output or frequency setting for the heating rate of the condition (II) or (ii). In such a case, the output or frequency setting of the power supply in the high-frequency induction heater may be maintained from the start of heating to sintering, and the ambient temperature may not be maintained from the ambient temperature at the start of heating to the ambient temperature during sintering. When the ambient temperature lower than the ambient temperature during sintering is not maintained, a sintered member can be produced in a short time. The heating rate at the ambient temperature of the condition (IV) or (iv) is preferably 15° C./s or more, particularly preferably 20° C./s or more.

Satisfying the condition (V) or (v) enables soaking of the green compact more easily than satisfying the condition (IV) or (iv). In other words, the condition (V) or (v) is particularly suitable to sinter a green compact with a complex shape. Satisfying the condition (V) or (v) also results in the production of a high-strength sintered member. The temperature range of the condition (V) is preferably 735° C. or less, particularly preferably 700° C. or less. The ambient temperature of the condition (v) is preferably 600° C. or less, particularly preferably 500° C. or less. The holding time of the ambient temperature of the condition (V) or (v) is preferably 45 seconds or more and 75 seconds or less. The heating rate after the temperature of the condition (V) or the ambient temperature of the condition (v) is maintained is the heating rate of the condition (II), (ii), (III), or (iii).

(Sintering Process)

The holding time at the ambient temperature during sintering of the green compact (sintering temperature) may be preferably 30 seconds or more and 90 seconds or less, depending on the ambient temperature (sintering temperature) and the size of the green compact. When the holding time is 30 seconds or more, the green compact can be sufficiently heated, and a high-strength sintered member can be easily produced. When the holding time is 90 seconds or less, a sintered member can be produced in a short time due to the short holding time. The holding time is more preferably less than 90 seconds, particularly preferably 60 seconds or less. For a large green compact, a holding time of 90 seconds or more may be effective.

The sintering temperature of the green compact may be equal to or higher than the temperature at which the Fe—C liquid phase is formed and may be 1153° C. or more. A sintering temperature of 1153° C. or more tends to result in the formation of the liquid phase, the formation of voids with round edges, and the production of a high-strength sintered member. The sintering temperature is preferably 1250° C. or less, for example. When the sintering temperature is 1250° C. or less, an excessively high temperature and excessive formation of the liquid phase can be prevented, and a sintered member with high dimensional accuracy can be easily produced. The sintering temperature preferably 1153° C. or more and 1200° C. or less, particularly preferably 1155° C. or more and 1185° C. or less.

The ambient temperature during sintering of the green compact is preferably 1135° C. or more and less than 1250° C. When the sintering temperature of the green compact satisfies 1153° C. or more, the ambient temperature during sintering of the green compact satisfies 1135° C. or more. Likewise, when the sintering temperature of the green compact satisfies 1250° C. or less, the ambient temperature during sintering of the green compact satisfies less than 1250° C. The ambient temperature during sintering is more preferably 1135° C. or more and 1185° C. or less, particularly preferably 1135° C. or more and less than 1185° C.

(Cooling Process)

The cooling rate in the cooling process in the sintering step is preferably increased. A higher cooling rate tends to result in the formation of a bainite structure, the formation of a martensite structure, and a sintered member with higher strength. The cooling rate is preferably 1° C./s or more. A cooling rate of 1° C./s or more can result in rapid cooling. The cooling rate is more preferably 2° C./s or more, particularly preferably 5° C./s or more. The cooling rate may be 200° C./s or less, 100° C./s or less, particularly 50° C./s or less.

The cooling temperature range with this cooling rate may range from a temperature at the start of cooling (the sintering temperature of the green compact) to a temperature at the completion of cooling (for example, approximately 200° C.). Particularly preferred is a temperature range (ambient temperature range) from a green compact temperature (ambient temperature) of 750° C. (700° C.) to 230° C. (200° C.). The cooling method may include blowing a coolant gas on the sintered member. The coolant gas may be an inert gas, such as nitrogen gas or argon gas. Rapid cooling can eliminate a downstream heat-treatment process.

[Other processes]

The method for producing a sintered member may include at least one of a heat-treatment process and a finishing process.

(Heat-Treatment Process)

The heat-treatment process includes quenching and/or tempering of the sintered member. This improves the mechanical characteristics, particularly hardness and strength, of the sintered member.

(Finishing Process)

In the finishing process, the dimensions of the sintered member are adjusted to the design dimensions. The finishing process may be sizing or polishing of the surface of the sintered member. In particular, polishing tends to decrease the surface roughness of the sintered member.

[Applications]

A method for producing a sintered member according to an embodiment is suitable for the production of various general structural parts (sintered parts of mechanical parts, such as sprockets, rotors, gears, rings, flanges, pulleys, and bearings).

[Operational Advantages]

A high-strength sintered member can be produced in a short time by a method for producing a sintered member according to one of these embodiments. This is because high-speed heating without maintaining the temperature in a temperature range in which C diffuses easily into Fe can effectively form the Fe—C liquid phase and can round edges of voids between particles.

[Sintered Member]

A sintered member is composed of bonded metal particles. The sintered member can be produced by the method for producing a sintered member described above. The sintered member has a composition including an Fe alloy containing C. The composition may further contain Cu and/or the additive element (Ni, Mo).

The sintered member includes voids with round edges. The voids in the sintered member have a sphericity of 50% or more and 85% or less. The sphericity is represented by [{area of void/(perimeter of void)$^2$}/0.0796]×100. The voids in the sintered member satisfying this range of sphericity have a somewhat round shape and round edges. Thus, the sintered member has high strength (radial crushing strength). The voids preferably have a sphericity of 55% or more and 80% or less, particularly preferably 58% or more and 78% or less. The area and perimeter of each void are determined as described later.

For a sintered member containing Cu, the diffusion area ratio of Cu in Fe (hereinafter referred to as a diffusion rate) is preferably high. The diffusion rate is preferably 40% or more, for example. A sintered member with a diffusion rate of 40% or more has high strength due to a large diffusion area ratio of Cu in Fe. The diffusion rate is more preferably 42% or more, particularly preferably 45% or more. The upper limit of the diffusion rate is approximately 65%, for example.

The diffusion rate is determined by an area analysis of a cross section of the sintered member with an electron probe microanalyzer (EPMA). The cross section of the sintered member may be any cross section. For a sintered member with a columnar or cylindrical shape, the cross section of the sintered member may be a cross section parallel to the axial direction of the sintered member. Three or more fields in the cross section of the sintered member are observed. For a sintered member with a cylindrical shape, for example, a cross section parallel to the axial direction of the sintered member is radially divided into three equal parts referred to as an inner circumferential region, a middle region, and an outer circumferential region, and at least one field in each region is observed. Each field is observed at a magnification of 200. Each observation field is 500 μm×460 μm in size. Each observation field is subjected to an element mapping analysis with EPMA. The analytical conditions include an accelerating voltage of 15 kV, a beam current of 100 nA, a beam diameter of 0.1 μm, and an analysis time of 3 hours. The ratio $(\alpha/\beta)\times 100$ is determined from each mapping image, wherein $\alpha$ denotes the total area of a region with a Cu concentration level of 0.4 or more and 0.65 or less times the maximum Cu concentration level, and $\beta$ denotes the total area of a region with a Cu concentration level of 0.16 or more times the maximum Cu concentration level. The total areas $\alpha$ and $\beta$ can be determined using image analysis software. The average of all the ratios is taken as the diffusion rate.

The sintered member preferably has a pearlite structure in which cementite and ferrite are layered. This is because the pearlite structure increases the strength of the sintered member. The pearlite structure is preferably fine. This is because the fine pearlite structure further increases the strength of the sintered member. The cementite in the pearlite structure preferably has a width of 120 nm or less, for example. Cementite with a width of 120 nm or less tends to make the pearlite structure fine and increase the strength of the sintered member. The cementite more preferably has a width of 100 nm or less, particularly preferably 80 nm or less. The lower limit of the width of the cementite is approximately 60 nm, for example. The distance between adjacent portions of the cementite in the pearlite structure (lamellar spacing) is preferably 250 nm or less, for example. A distance of 250 nm or less tends to make the pearlite structure fine and increase the strength of the sintered member. The distance is more preferably 200 nm or less or 180 nm or less, particularly preferably 150 nm or less or 130 nm or less. The lower limit of the distance is approximately 100 nm, for example.

The width of the cementite and the distance between adjacent portions of the cementite are the average width of the cementite and the average distance between adjacent portions of the cementite, respectively, determined as described below. Three or more observation fields are chosen in a cross section of the sintered member with a field-emission scanning electron microscope. The cross section of the sintered member and each observation field are chosen in the same manner as in the determination of the diffusion rate. Each field is observed at a magnification of 17000. Each observation field is 8.1 μm×5.7 μm in size. In each observation field, the width of the cementite and the distance between adjacent portions of the cementite are measured at 21 points using image analysis software. The 21 points include 7 points in a portion with a narrow width or a short distance, 7 points in a portion with a wide width or a long distance, and 7 points in a portion with an intermediate width or an intermediate distance. The width of the cementite refers to the length perpendicular to the longitudinal direction of the cementite. The distance between adjacent portions of the cementite refers to, in laterally adjacent portions of the cementite, the distance between the right side of the left portion of the cementite and the left side of the right portion of the cementite. For example, for a sintered member with a cylindrical shape, when a cross section parallel to the axial direction of the sintered member is radially divided into three equal parts referred to as an inner circumferential region, a middle region, and an outer circumferential region, and at least one field in each region is chosen, the width of the cementite and the distance between adjacent portions of the cementite refer to the average of the widths of the cementite in all the regions and the average of the distances between adjacent portions of the cementite in all the regions, respectively.

[Applications]

A sintered member according to an embodiment is suitable for various general structural parts (sintered parts of mechanical parts, such as sprockets, rotors, gears, rings, flanges, pulleys, and bearings).

[Operational Advantages]

A sintered member according to one of these embodiments has high strength (radial crushing strength). Voids in the sintered member have a somewhat round shape and round edges. Thus, the sintered member has fewer sharp portions of voids that act as origins of fracture and decrease the strength.

Test Example 1

Differences in strength of sintered members produced by different methods for producing a sintered member were examined.

[Samples No. 1 to No. 4]

Two sintered members of each of samples No. 1 to No. 4 were prepared in the same manner as in the method for producing a sintered member described above through the preparing step, the forming step, and the sintering step.

[Preparing Step]

A mixed powder containing an Fe powder, a Cu powder, and a C powder was prepared as a raw powder. The Fe powder had an average particle size (D50) of 65 μm, the Cu powder had an average particle size (D50) of 22 μm, and the C powder had an average particle size (D50) of 18 μm. The Cu powder content was 2.0% by mass, the C powder content was 0.8% by mass, and the Fe powder content was the remainder.

[Forming Step]

The raw powder was press-formed to form a cylindrical (outer diameter: 34 mm, inner diameter: 20 mm, height: 10 mm) green compact. The forming pressure was 600 MPa.

[Sintering Step]

The green compact was heated by high-frequency induction heating to form a sintered member. A high-frequency induction heater used in the present example included a power supply that could control the output and frequency, a coil coupled to the power supply (wire diameter: 10 mm, inner diameter: 50 mm), a storage container that was located in the coil and housed the green compact, a gas supply line for supplying an inert gas to the storage container, and a gas discharge line for discharging gas from the storage container. The storage container was made of a material that could not be induction-heated (ceramic). The inert gas was nitrogen gas. The sintering step included a heating process, a sintering process, and a cooling process in this order. The ambient temperature was measured in each process. The ambient temperature was measured with a thermocouple (diameter: Φ 3.5 mm) separated 8.5 mm or less from the green compact in the storage container. In the present example, the thermocouple was located on the inside of the inner circumferential surface of the green compact (at the center of the green compact).

(Heating Process)

In the heating process, the output and frequency of the power supply in the high-frequency induction heater were held constant, and the temperature was increased without being maintained in a particular temperature range. More specifically, the temperature was not maintained in a temperature range equal to or higher than the $A_1$ point of the Fe—C phase diagram and lower than the sintering temperature of the green compact. In the samples No. 1 to No. 3, the output was approximately 8.0 kW, and the frequency was 3.5 kHz. In the sample No. 4, the output was approximately 8.7 kW, and the frequency was 3.8 kHz.

(Sintering Process)

In the sintering process, the green compact was maintained at a specified temperature for a predetermined time. In the samples No. 1 to No. 3, the ambient temperature was maintained for 30, 60, or 90 seconds after reaching 1135° C. In the sample No. 4, the ambient temperature was maintained for 30 seconds after reaching 1185° C. The output and frequency were controlled to maintain the ambient temperature of 1135° C. or 1185° C.

(Cooling Process)

In the cooling process, the sintered member was cooled by blowing a coolant gas (nitrogen gas) on the sintered member. As listed in Table 1, the cooling rate (° C./s) was 1° C./s or more in an ambient temperature range from a temperature at the start of cooling (the completion of sintering) to 200° C. Consequently, the cooling rate was approximately 3° C./s in a temperature range from a temperature at the start of cooling to 700° C. and was approximately 1° C./s in a temperature range of 700° C. to 200° C.

The heating rate in an ambient temperature range corresponding to the $A_1$ point to the $A_3$ point of the Fe—C phase diagram (700° C. to 900° C.) and the heating rate in an ambient temperature range corresponding to the $A_3$ point to the sintering temperature of the green compact (900° C. to 1135° C., 900° C. to 1185° C.) were determined from the ambient temperature change (temperature profile) in each sample from the heating process to the cooling process. Table 1 shows the results. The heating rate in an ambient temperature range of 200° C. to 700° C. and the heating rate in an ambient temperature range of 400° C. to 700° C. were determined from the temperature profile. The heating rates in these ambient temperature ranges were 12° C./s or more in each sample. FIG. 1 is a temperature profile of a sintered member of the sample No. 1. In FIG. 1, the horizontal axis is the sintering time (s), and the vertical axis is the ambient temperature (° C.). The temperature profiles of the samples No. 2 to No. 4 were similar to FIG. 1 of the sample No. 1 and are omitted. In the samples No. 1 to No. 4, the time from the start of heating to the completion of sintering (the start of cooling) was approximately 2 to 3 minutes, and the time from the start of heating to the completion of cooling was approximately 15 minutes.

[Sample No. 101]

Figure 13:
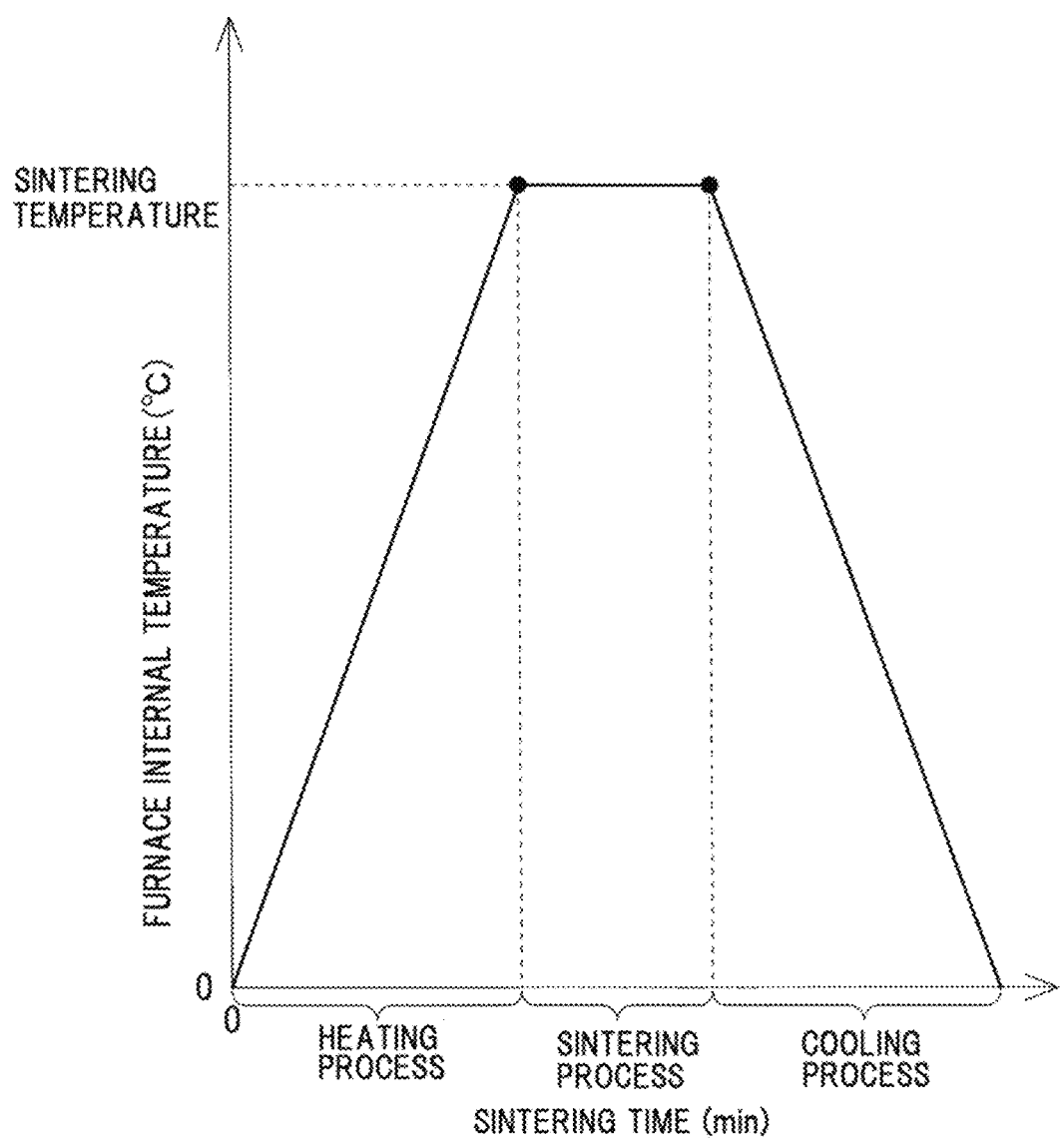
FIG. 13 is a graph of a temperature profile of a sintered member according to a sample No. 101 in the sintering step.

A sintered member of the sample No. 101 was produced in the same manner as in the sample No. 1 except that a continuous belt sintering furnace was used in the sintering step. As listed in Table 1, the ambient temperature in the sintering furnace was such that the sintering temperature of the green compact was 1130° C. Table 1 lists the holding time of the ambient temperature in the sintering furnace. In the continuous belt sintering furnace, which requires a long sintering time of the green compact, the ambient temperature of the sintering furnace tends to approach the temperature of the green compact. The heating rate in the heating process in the same temperature range as in the sample No. 1 and the cooling rate in the cooling process in the same temperature range as in the sample No. 1 were determined from the temperature profile of the sample No. 101. Table 1 shows the results. The temperature profile showed that the heating rate of the sample No. 101 was substantially constant at 0.7° C./s from the start of heating to a temperature lower than the sintering temperature. FIG. 13 is a temperature profile in the sintering step of the green compact of the sample No. 101. In FIG. 13, the horizontal axis is the sintering time (min), and the vertical axis is the ambient temperature (° C.) in the sintering furnace. In the sample No. 101, the time from the start of heating to the completion of sintering (the start of cooling) was approximately 40 minutes, and the time from the start of heating to the completion of cooling was approximately 100 minutes or more.

TABLE 1

| | | Sintering step | | | | | |
|---|---|---|---|---|---|---|---|
| | | Heating process Heating rate (° C./s) | | Sintering process | | | |
| | | Ambient temperature range | | Ambient temperature during sintering (° C.) | Holding time at ambient temperature | Cooling process | |
| Sample No. | Method, apparatus | Corresponding to $A_1$ point to $A_3$ point | Corresponding to $A_3$ point to sintering temperature | | | Cooling rate (° C./s) | Cooling temperature range |
| 1 | High-frequency induction heating | 12.5 | 4.8 | 1135 | 30 sec. | 1.0 | 1135° C. to 200° C. |
| 2 | High-frequency induction heating | 12.5 | 4.8 | 1135 | 60 sec. | 1.0 | 1135° C. to 200° C. |
| 3 | High-frequency induction heating | 12.5 | 4.8 | 1135 | 90 sec. | 1.0 | 1135° C. to 200° C. |
| 4 | High-frequency induction heating | 12.5 | 4.8 | 1185 | 30 sec. | 1.0 | 1185° C. to 200° C. |
| 101 | Continuous belt sintering | 0.70 | 0.70 | 1130 | about 16 min. | 0.61 | 1130° C. to 200° C. |

[Measurement of Density]

The apparent density (g/cm³) of the sintered member of each sample was measured using Archimedes' principle. The apparent density of the sintered member was determined by "(the dry weight of the sintered member)/{(the dry weight of the sintered member)−(the weight in water of an oil-immersed sintered member)}×the density of water". The weight in water of oil-immersed sintered member refers to the weight of a sintered member immersed in and impregnated with oil and then immersed in water. Table 2 lists the measured apparent density of the sintered member of each sample.

[Evaluation of Dimensional Accuracy]

The dimensional accuracy of the sintered member of each sample was evaluated by measuring the dimensions of the green compact before sintering and the dimensions of the sintered member after the sintering and determining dimensional changes due to the sintering. The dimensional changes were the rate of change in outer diameter and inner diameter in the X-axis direction (%), the rate of change in outer diameter and inner diameter in the Y-axis direction (%), the rate of change in height (%), and the circularity with respect to the outer diameter and the inner diameter (mm). The X-axis direction and the Y-axis direction refer to radial directions of the green compact and the sintered member and intersect at right angles. The rate of change in outer diameter in the X-axis direction was determined by [the absolute value of {(the outer diameter of the sintered member in the X-axis direction)−(the outer diameter of the green compact in the X-axis direction)}/(the outer diameter of the green compact in the X-axis direction)]×100. The rate of change in outer diameter in the Y-axis direction, the rate of change in inner diameter in the X-axis direction, the rate of change in inner diameter in the Y-axis direction, and the rate of change in height were determined in the same manner by replacing "the X-axis direction" with "the Y-axis direction", "outer diameter" with "inner diameter", and "outer diameter in the X-axis direction" with "height" in "the rate of change in outer diameter in the X-axis direction". The circularity with respect to the outer diameter was determined by the absolute value of (the outer diameter in the X-axis direction−the outer diameter in the Y-axis direction)/2 of the sintered member. The circularity with respect to the inner diameter was determined in the same manner by replacing "outer diameter" with "inner diameter" in "the circularity with respect to the outer diameter". The outer diameter and the inner diameter in the X-axis direction were the averages of the outer diameters and the inner diameters at three different points in the height direction. This also applies to the outer diameter and the inner diameter in the Y-axis direction. The measuring points in the height direction were located at regular intervals. The height was the average of the heights at four points in the circumferential direction. The measuring points in the circumferential direction were located at regular intervals. Table 2 shows the results.

[Evaluation of Strength]

The strength of the sintered member of each sample was evaluated by measuring the radial crushing strength and Rockwell hardness HRB.

[Radial Crushing Strength]

The radial crushing strength was measured according to "Sintered metal bearing—Determination of radial crushing strength JIS Z 2507 (2000)". More specifically, a tubular sintered member was placed between two radially opposite plates, and a load was applied to one of the plates. The maximum load at which the tubular sintered member was broken was measured. The maximum load (average, n=3) was evaluated as the radial crushing strength (MPa). Table 2 shows the results.

[Rockwell Hardness]

The Rockwell hardness HRB was measured according to "Rockwell hardness test—Test method JIS Z 2245 (2016)". The Rockwell hardness HRB was measured at three points on each of the upper and lower end faces of the sintered member and was averaged. The measuring points on each end face were located at regular intervals in the circumferential direction. Table 2 shows the results.

TABLE 2

| Sample No. | Apparent density (g/cm³) | Dimensional accuracy | | | | | | | Strength | | |
|---|---|---|---|---|---|---|---|---|---|---|---|
| | | Rate of change(%) | | | | | Sphericity(mm) | | Rockwall hardness HRB | | Radial crushing strength (MPa) |
| | | Outer diameter | | Inner diameter | | Height | Outer Diameter | Inner Diameter | Upper end face | Lower end face | |
| | | X-axis | Y-axis | X-axis | Y-axis | | | | | | |
| 1 | 6.816 | 0.132 | 0.210 | 0.221 | 0.210 | 0.223 | 0.005 | 0.003 | 78.1 | 75.7 | 1230.5 |
|  | 6.371 | 0.200 | 0.223 | 0.201 | 0.223 | 0.210 | 0.004 | 0.002 | 91.2 | 92.0 | 1263.8 |
| 2 | 6.866 | 0.197 | 0.199 | 0.200 | 0.212 | 0.212 | 0.003 | 0.004 | 81.4 | 76.7 | 1243.5 |
|  | 6.795 | 0.232 | 0.211 | 0.218 | 0.235 | 0.215 | 0.004 | 0.002 | 78.3 | 79.5 | 1150.2 |
| 3 | 6.752 | 0.192 | 0.225 | 0.219 | 0.225 | 0.193 | 0.005 | 0.002 | 77.2 | 75.6 | 890.1 |
|  | 6.749 | 0.186 | 0.213 | 0.225 | 0.217 | 0.198 | 0.005 | 0.002 | 78.9 | 78.4 | 920.3 |
| 4 | 7.114 | 0.251 | 0.271 | 0.258 | 0.241 | 0.206 | 0.006 | 0.003 | 96.1 | 92.9 | 1380.0 |
|  | 7.191 | 0.260 | 0.274 | 0.231 | 0.242 | 0.211 | 0.005 | 0.004 | 98.4 | 93.8 | 1575.3 |
| 101 | 6.752 | 0.131 | 0.138 | 0.119 | 0.124 | 0.194 | 0.002 | 0.001 | 75.8 | 74.8 | 877.3 |
|  | 6.806 | 0.125 | 0.141 | 0.119 | 0.124 | 0.124 | 0.004 | 0.001 | 75.7 | 73.8 | 864.8 |

Table 2 shows that the apparent density and dimensional accuracy of each sintered member of the samples No. 1 to No. 3 are almost the same as those of the sample No. 101. The apparent density and dimensional accuracy of the sintered member of the sample No. 4 are close to those of the sample No. 101 but are not as close as those of the samples No. 1 to No. 3. Thus, a sintered member with high dimensional accuracy can be produced by high-frequency induction heating.

Table 2 shows that the radial crushing strength and Rockwell hardness of each sintered member of the samples No. 1 to No. 4 are higher than those of the sample No. 101. Thus, a high-strength sintered member can be produced in a short time. In particular, a comparison between the samples No. 1 to No. 4 shows that each sintered member of the samples No. 1, No. 2, and No. 4, which had a relatively short holding time in the sintering process, has higher strength than the sample No. 3, which had a relatively long holding time in the sintering process. A comparison between the samples No. 1 and No. 4 shows that the sintered member of the sample No. 4, which was maintained at a relatively high ambient temperature in the sintering process, has higher strength than the sample No. 1, which was maintained at a relatively low ambient temperature in the sintering process.

A cross section of each sintered member of the samples No. 1, No. 2, No. 4, and No. 101 was observed with a microscope (Keyence Corporation VH-ZST, magnification: 1000). The cross section was illuminated at an angle. FIGS. 2 to 4 and 14 show photomicrographs. The cross section was exposed as described below. A test specimen cut from the sintered member was embedded in an epoxy resin to form an embedded sample. The embedded sample was polished. The polishing was performed in two steps. In the first step, the resin of the embedded sample was polished to expose the section of the test specimen. In the second step, the exposed section of the test specimen was polished. The polishing was mirror polishing. Thus, the observed cross section was a mirror polished face. Light gray portions in each figure are voids.

Figure 2:
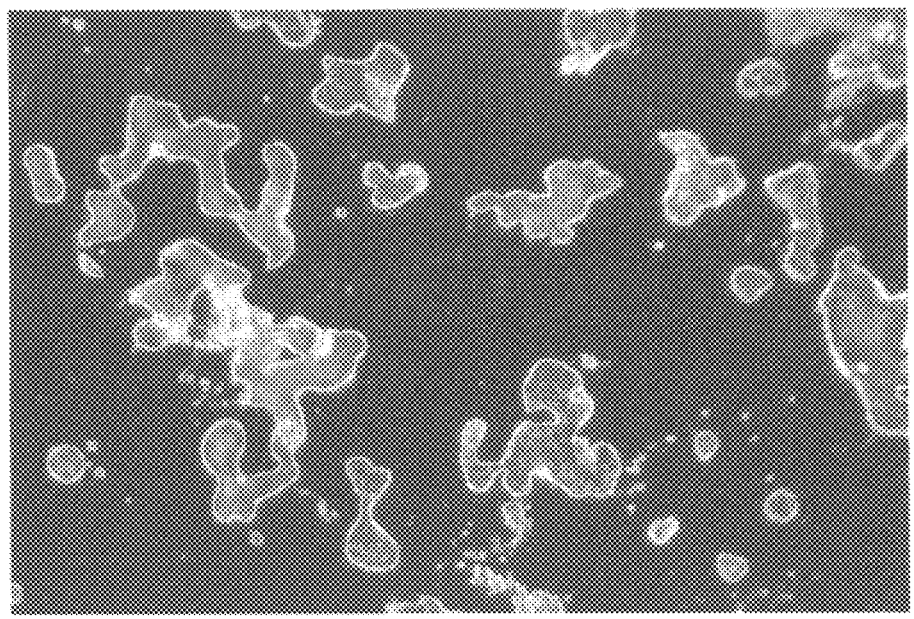
FIG. 2 is a photomicrograph of a cross section of the sintered member according to the sample No. 1.
Figure 3:
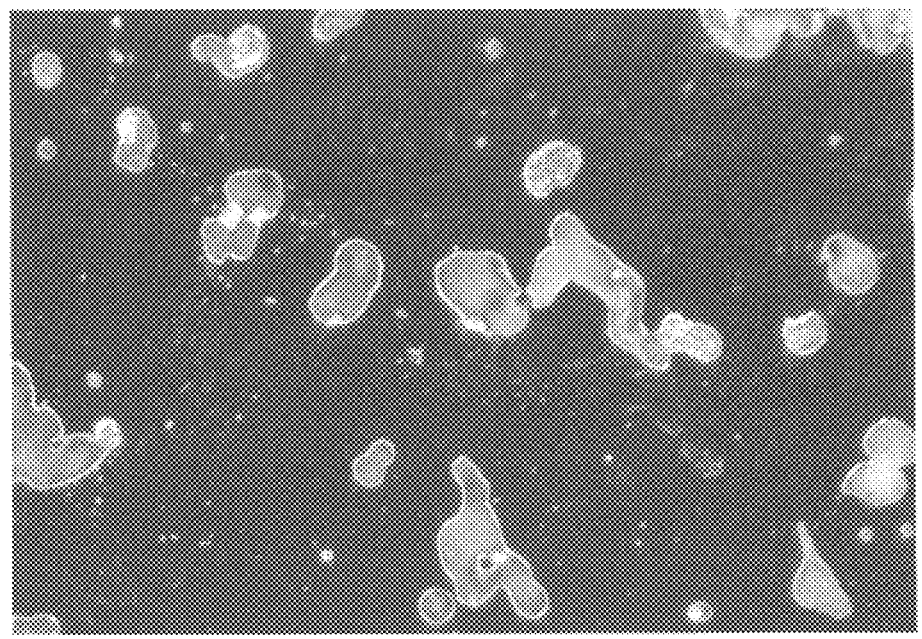
FIG. 3 is a photomicrograph of a cross section of a sintered member according to a sample No. 2.
Figure 4:
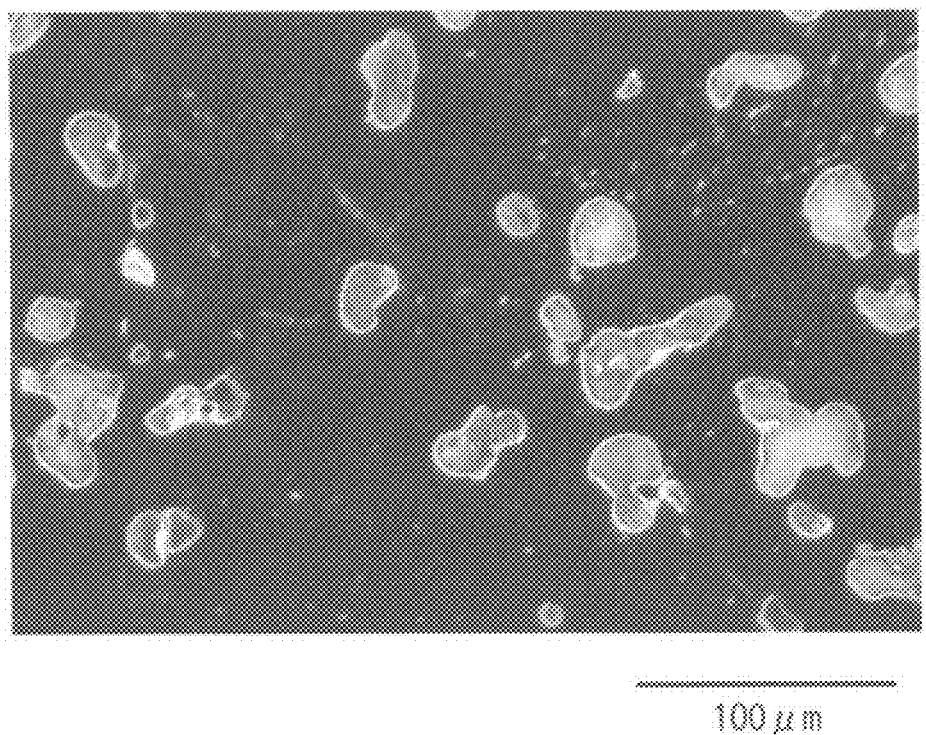
FIG. 4 is a photomicrograph of a cross section of a sintered member according to a sample No. 4.
Figure 14:
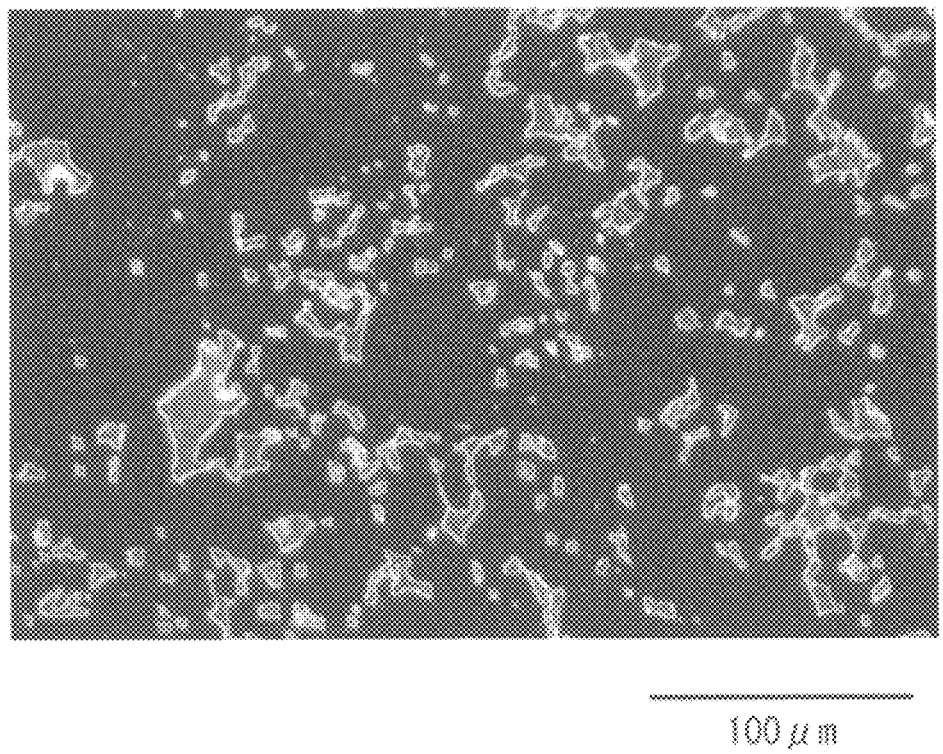
FIG. 14 is a photomicrograph of a cross section of the sintered member according to the sample No. 101.

As shown in FIGS. 2 to 4, the voids in each sintered member of the samples No. 1, No. 2, and No. 4 had round edges and a few (almost no) sharp portions. As shown in FIG. 14, the voids in the sintered member of the sample No. 101 had edges with acute angles.

In the samples No. 1, No. 2, and No. 4, high-speed heating without maintaining the temperature in a temperature range in which C diffuses easily into Fe probably resulted in the formation of the Fe—C liquid phase, which rounded the edges of the voids. By contrast, in the sample No. 101, maintaining the temperature for extended periods in the temperature range in which C diffuses easily into Fe probably resulted in the diffusion and solid solution of substantially all C in Fe and resulted in the formation of substantially no liquid phase. The sintered members of the samples No. 1, No. 2, and No. 4 had few sharp portions of voids that act as origins of fracture and decrease the strength, had voids with round edges, and therefore had higher strength than that of the sample No. 101. Like the sample No. 1, the sample No. 3, which had higher strength than the sample No. 101, probably had voids with round edges.

Figure 5:
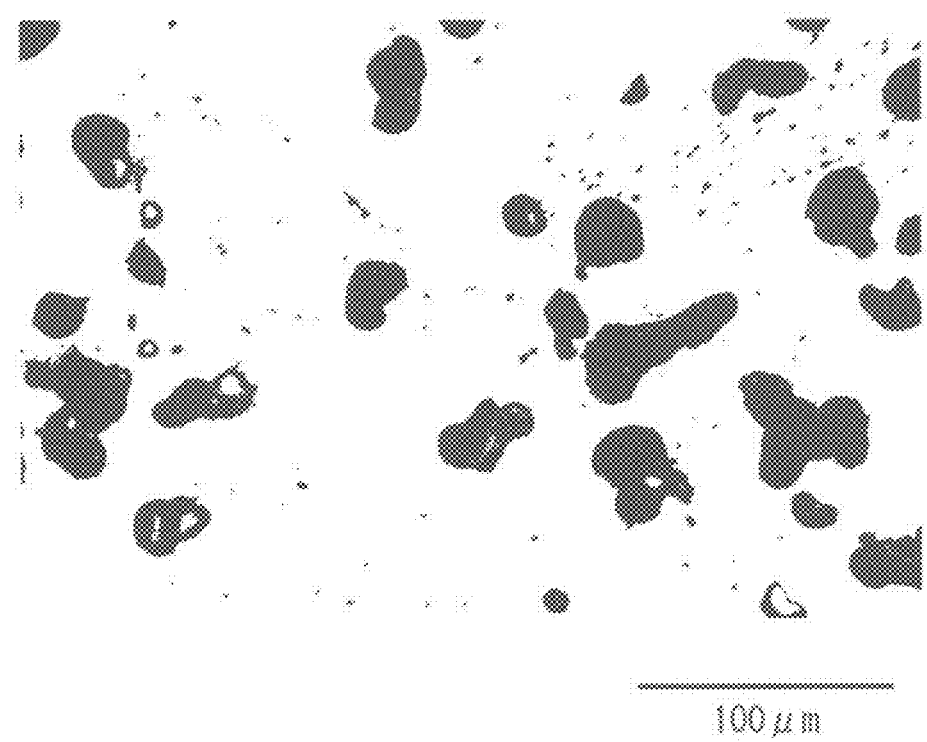
FIG. 5 is a binarized image of the cross-sectional image of the sintered member according to the sample No. 4 shown in FIG. 4.
Figure 6:
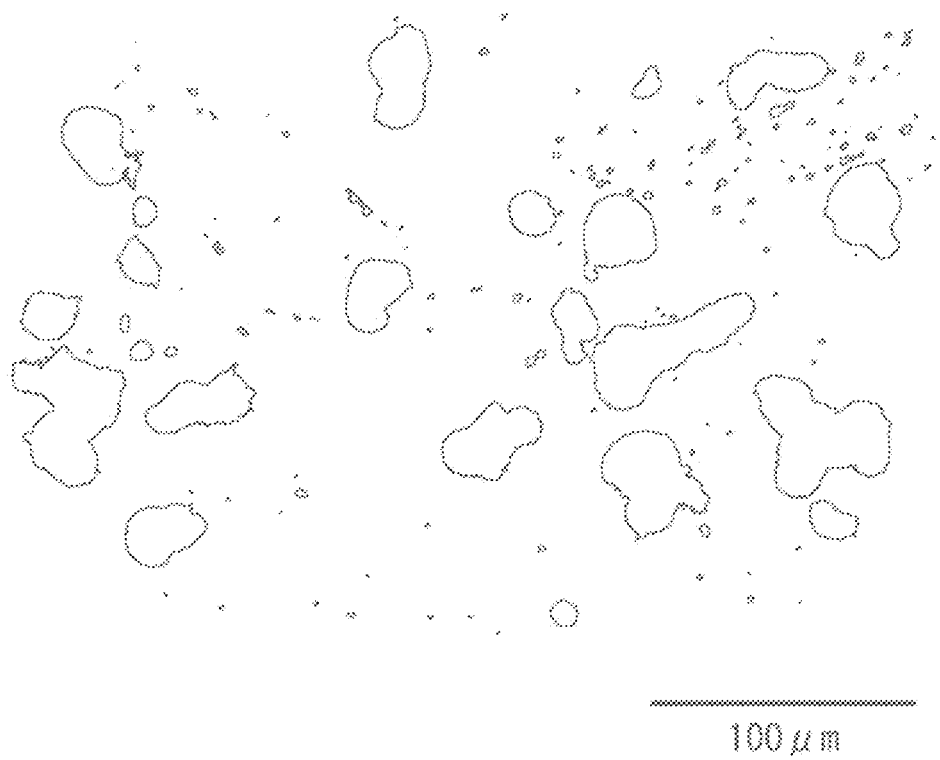
FIG. 6 is an image of outlines of voids extracted by an image analysis of the binarized image of FIG. 5.

The sphericity [{area of void/(perimeter of void)$^2$}/0.0796]×100 of each void was determined from the cross-sectional image of each sintered member of the samples No. 1, No. 2, No. 4, and No. 101 in FIGS. 2 to 4 and 14. The area and perimeter of each void was determined from a binarized image using image analysis software (National Institutes of Health, free software ImageJ). FIG. 5 shows a binarized image of the image of the sample No. 4 (FIG. 4) as a representative. The voids and the rest were separated by binarization into black and white portions. FIG. 6 is an image of outlines of voids extracted by an image analysis of the binarized image of FIG. 5 in order to determine the area and perimeter of each void. Binarized images and extracted images of the other samples are not shown. The values [{area of void/(perimeter of void)$^2$}/0.0796]×100 of 30 voids with the largest void area of all the voids in the extracted image of FIG. 6 were averaged as the sphericity of the voids of the sintered member. The sphericity of the voids was 59.7% in the sample No. 1, 77.8% in the sample No. 2, 76.0% in the sample No. 4, and 38.1% in the sample No. 101.

The diffusion area ratio of Cu in Fe (diffusion rate) was determined in the sintered member of each sample. The diffusion rate was determined by an area analysis of a cross section of the sintered member with FE-EPMA (JXA-8530F) manufactured by JEOL Ltd. The cross section of the sintered member was parallel to the axis of the sintered member. The cross section was exposed by polishing in two steps, as described above. Thus, the cross section was a mirror polished face. The cross section of the sintered member was radially divided into three equal parts referred to as an inner circumferential region, a middle region, and an outer circumferential region, and one field in each region was observed. Each field was observed at a magnification of 200. Each observation field was 500 μm×460 μm in size.

Figure 7:
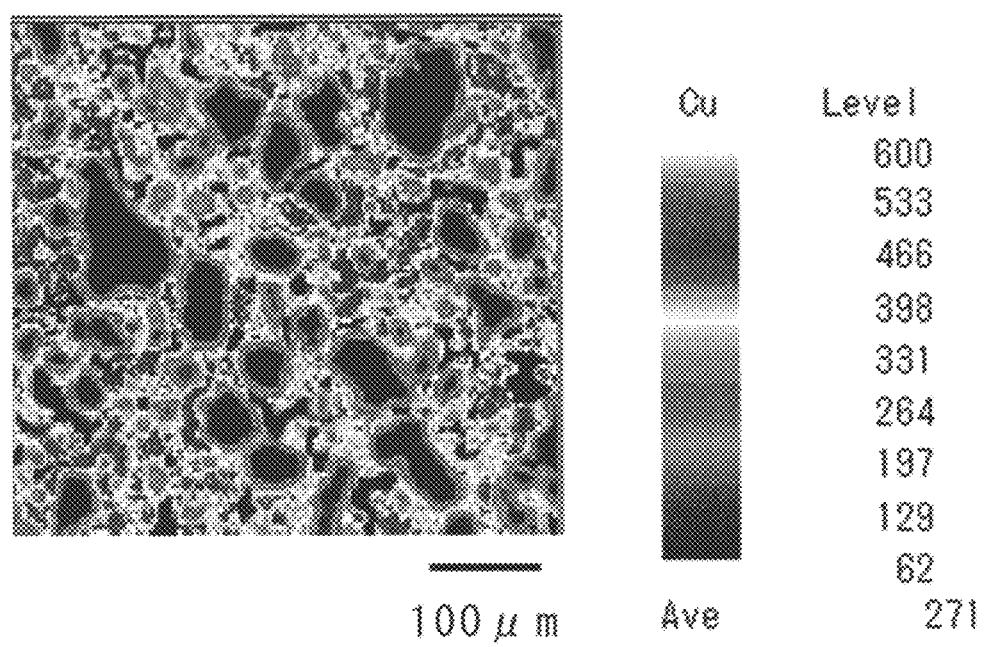
FIG. 7 is a distribution diagram of an element concentration distribution in an inner circumferential region of a cross section of the sintered member according to the sample No. 1.
Figure 8:
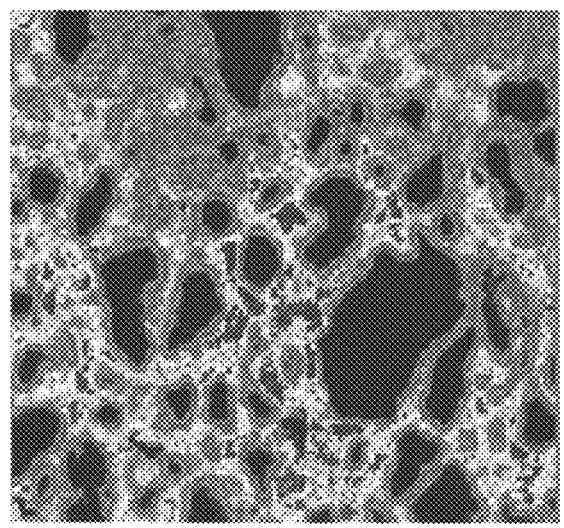
FIG. 8 is a distribution diagram of an element concentration distribution in a middle region of the cross section of the sintered member according to the sample No. 1.
Figure 9:
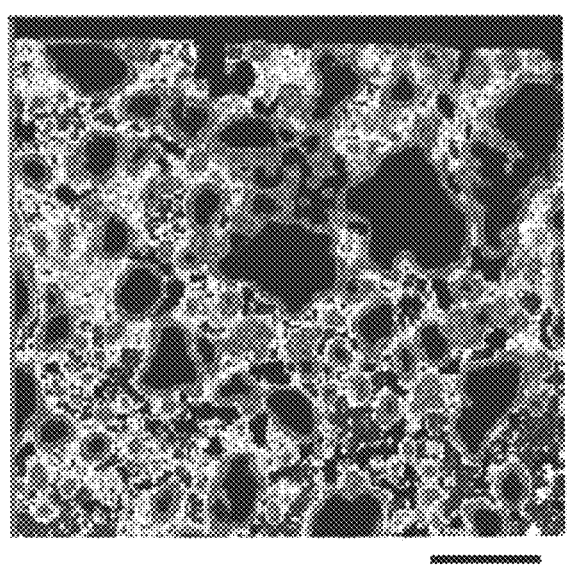
FIG. 9 is a distribution diagram of an element concentration distribution in an outer circumferential region of the cross section of the sintered member according to the sample No. 1.
Figure 15:
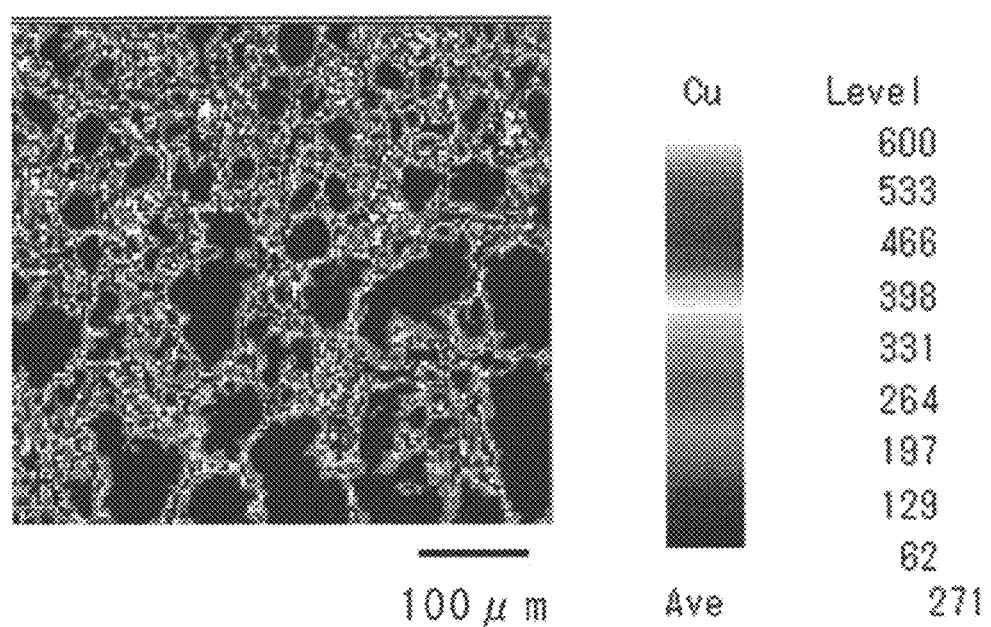
FIG. 15 is a distribution diagram of an element concentration distribution in an inner circumferential region of a cross section of the sintered member according to the sample No. 101.
Figure 16:
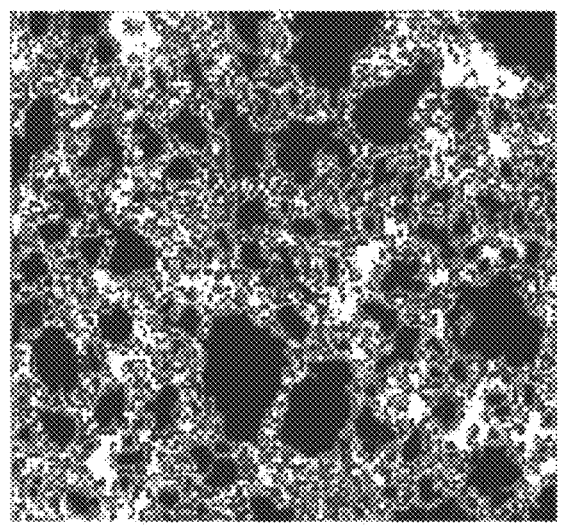
FIG. 16 is a distribution diagram of an element concentration distribution in a middle region of the cross section of the sintered member according to the sample No. 101.
Figure 17:
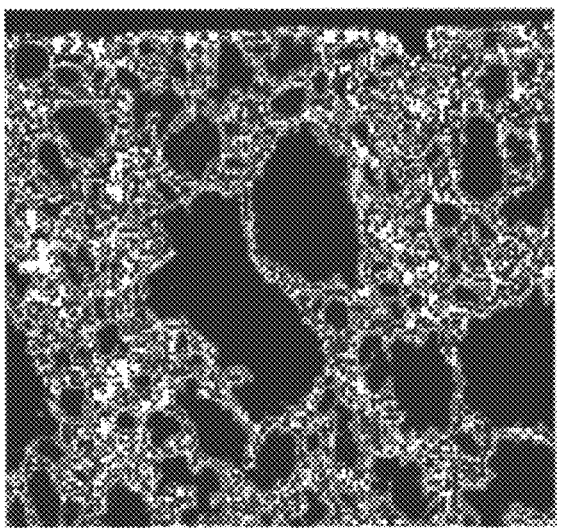
FIG. 17 is a distribution diagram of an element concentration distribution in an outer circumferential region of the cross section of the sintered member according to the sample No. 101.

Each observation field was subjected to an element mapping analysis with the FEEPMA. The analytical conditions included an accelerating voltage of 15 kV, a beam current of 100 nA, a beam diameter of 0.1 μm, and an analysis time of 3 hours. FIGS. 7 to 9 and FIGS. 15 to 17 show distribution diagrams (mapping images) of the element concentration distribution in each sintered member of the samples No. 1 and No. 101 as representatives. FIGS. 7 to 9 are mapping images of each observation field in the inner circumferential region, the middle region, and the outer circumferential region in the cross section of the sintered member of the sample No. 1. FIGS. 15 to 17 are mapping images of each observation field in the inner circumferential region, the middle region, and the outer circumferential region in the cross section of the sintered member of the sample No. 101. In each mapping image, the maximum Cu concentration level was 600. In each mapping image, the ratio $(\alpha/\beta) \times 100$ was determined, wherein α denotes the total area of a region with a Cu concentration level of 240 or more and 390 or less (0.4 or more and 0.65 or less times the maximum Cu concentration level 600), and β denotes the total area of a region with a Cu concentration level of 96 or more (0.16 or more times the maximum Cu concentration level). The total areas α and β were determined using image analysis software (ImageJ). The average of all the ratios was taken as the diffusion rate.

In the sintered member of the sample No. 1, the ratio was 46.2% in the inner circumferential region, 62.5% in the middle region, and 48.4% in the outer circumferential region. Thus, the sintered member of the sample No. 1 had a diffusion rate of approximately 52.4% as the average of the ratios. Thus, in all of the inner circumferential region, the middle region, and the outer circumferential region of the sintered member of the sample No. 1, the ratio was 40% or more, and the diffusion rate was 40% or more. Although not shown, as in the sintered member of the sample No. 1, in all of the inner circumferential region, the middle region, and the outer circumferential region of each sintered member of the samples No. 2 to No. 4, the ratio was 40% or more, and the diffusion rate was 40% or more. By contrast, in the sintered member of the sample No. 101, the ratio was 30.8% in the inner circumferential region, 19.7% in the middle region, and 25.8% in the outer circumferential region. Thus, the sintered member of the sample No. 101 had a diffusion rate of approximately 25.4% as the average of the ratios.

The structure of the sintered member of each sample was observed. A mirror polished face of each sintered member produced as described above was etched, and the etched face was observed with an optical microscope. In the structure of the portion other than the voids in the sintered member of each sample, fine pearlite was 90% or more by area of the total area of the region other than the voids in the image, and the remainder was bainite. The structure of each sintered member of the samples No. 1 to No. 3 was finer pearlite as compared with the sample No. 101.

Figure 10:
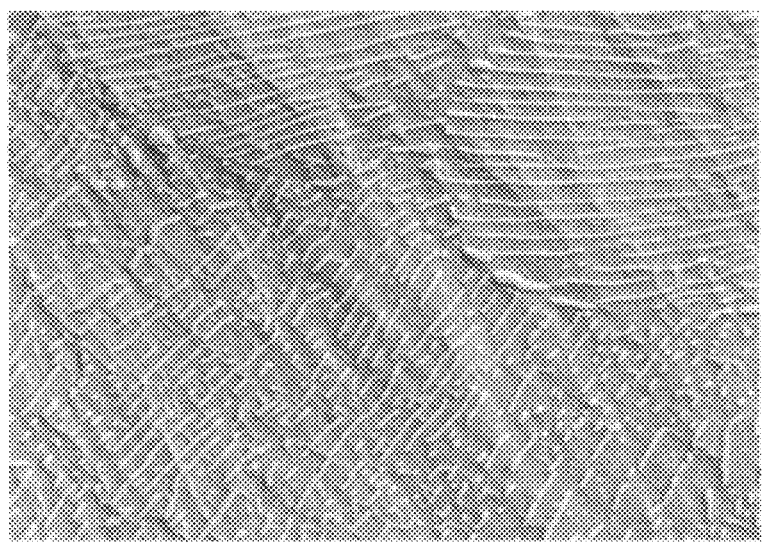
FIG. 10 is a photomicrograph of a structure in the inner circumferential region of the cross section of the sintered member according to the sample No. 1.
Figure 11:
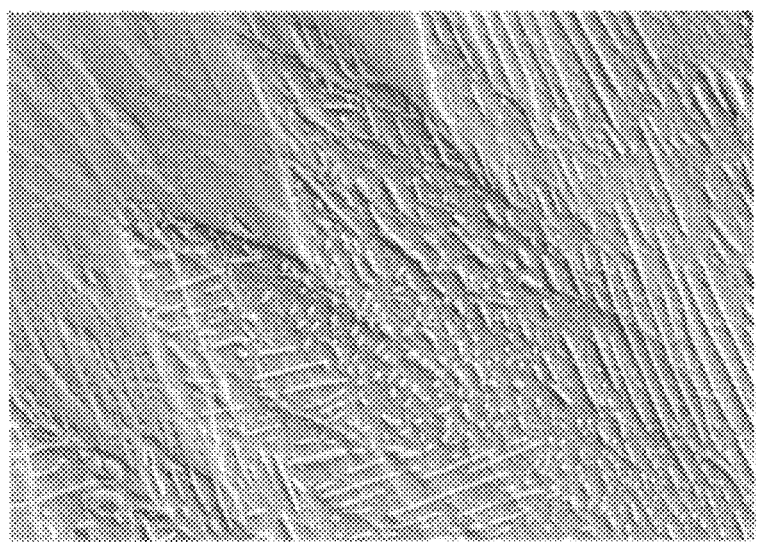
FIG. 11 is a photomicrograph of a structure in the middle region of the cross section of the sintered member according to the sample No. 1.
Figure 12:
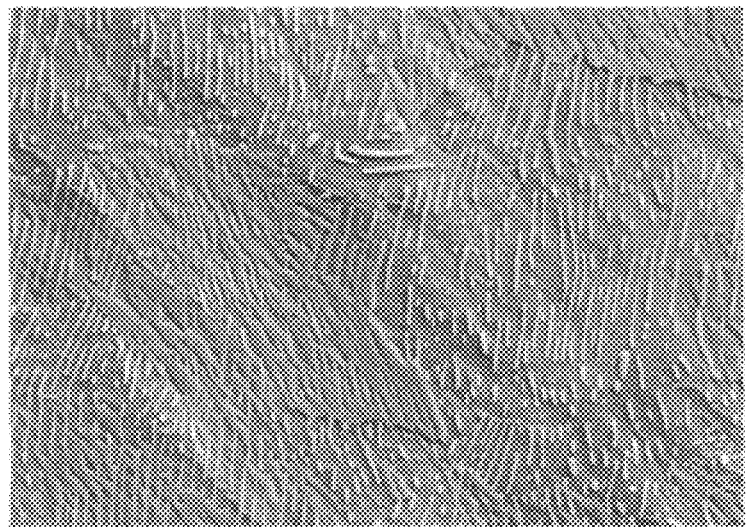
FIG. 12 is a photomicrograph of a structure in the outer circumferential region of the cross section of the sintered member according to the sample No. 1.

FIGS. 10 to 12 and FIGS. 18 to 20 are images of the structure of each sintered member of the samples No. 1 and No. 101 as representatives. These images were taken with a field-emission scanning electron microscope (JSM-7600F) manufactured by JEOL Ltd. FIGS. 10 to 12 are images of the structures in the inner circumferential region, the middle region, and the outer circumferential region, respectively, in the cross section of the sintered member of the sample No.

Figure 18:
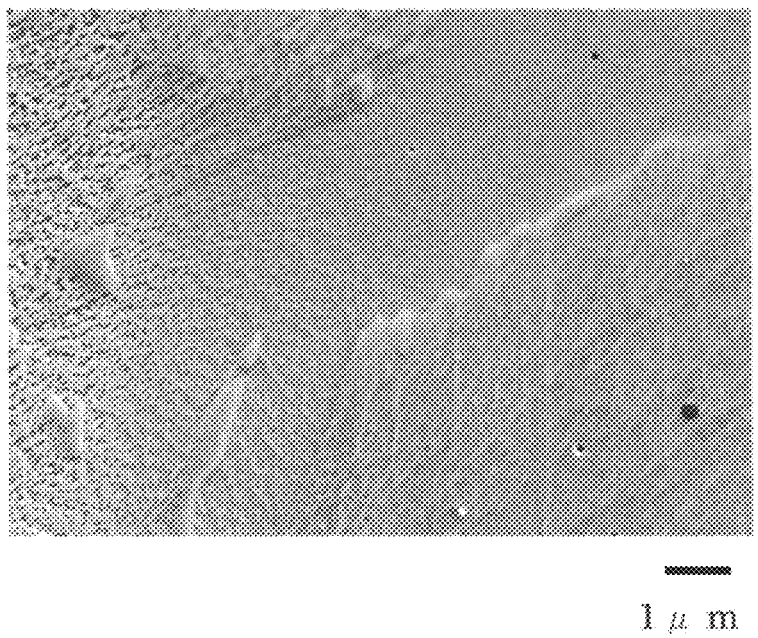
FIG. 18 is a photomicrograph of a structure in the inner circumferential region of the cross section of the sintered member according to the sample No. 101.
Figure 19:
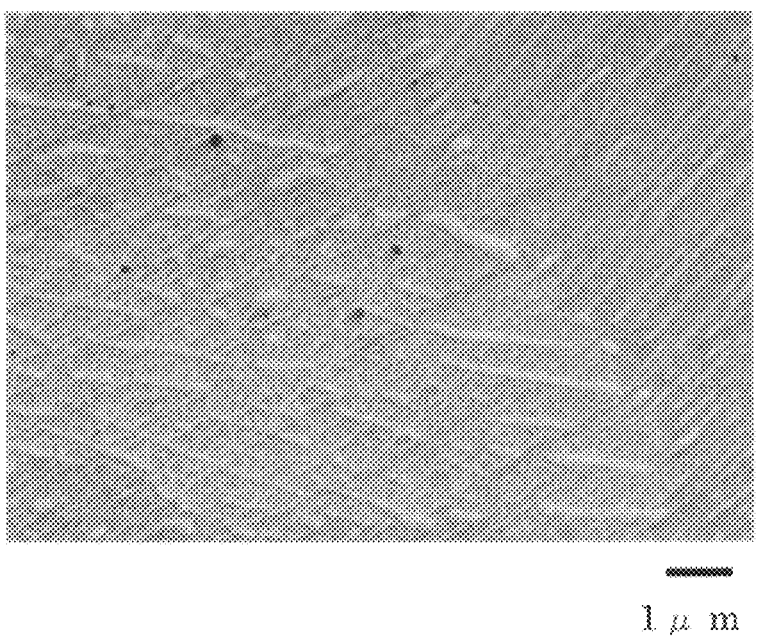
FIG. 19 is a photomicrograph of a structure in the middle region of the cross section of the sintered member according to the sample No. 101.
Figure 20:
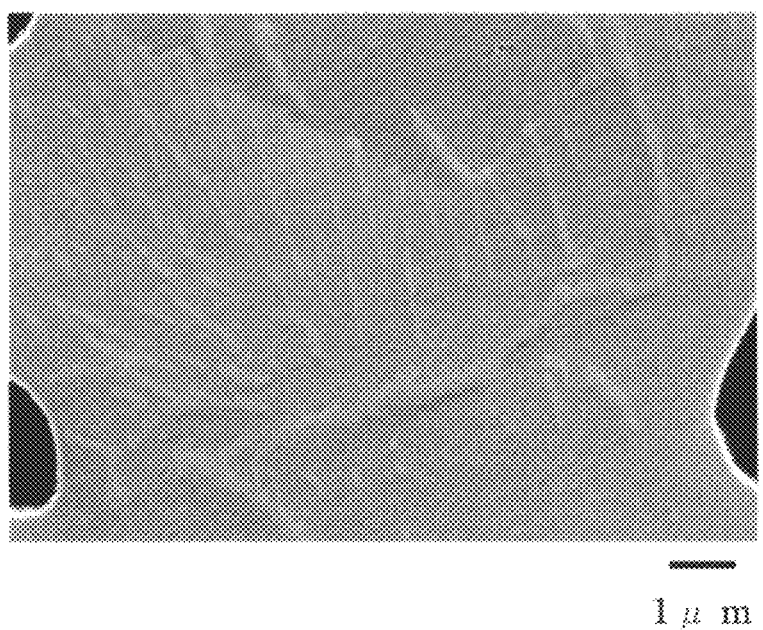
FIG. 20 is a photomicrograph of a structure in the outer circumferential region of the cross section of the sintered member according to the sample No. 101.

1. FIGS. 18 to 20 are images of the structures in the inner circumferential region, the middle region, and the outer circumferential region, respectively, in the cross section of the sintered member of the sample No. 101.

As shown in FIGS. 10 to 12, the structure of the sintered member of the sample No. 1 was pearlite in which cementite and ferrite were layered. Long protrusions in each figure are formed of cementite, and portions between the cementite portions are formed of ferrite. The pearlite in the sintered member of the sample No. 1 was very fine due to a very small width of the cementite and a very small distance between adjacent portions of the cementite. Although not shown, each sintered member of the samples No. 2 and No. 3 had a structure similar to that of the sample No. 1.

As in the sample No. 1, the structure of the sintered member of the sample No. 101 was pearlite in which cementite and ferrite were layered, as shown in FIGS. 18 to 20. However, the pearlite in the sintered member of the sample No. 101 was coarse due to a much larger width of the cementite and a much larger distance between adjacent portions of the cementite than in the sample No. 1.

The width of the cementite and the distance between adjacent portions of the cementite in the sintered member of each sample were determined as described below. First, a cross section parallel to the axis of the sintered member was chosen. The cross section was exposed by polishing in two steps, as described above. The exposed mirror polished face was etched with initial. Backscattered electron images of the inner circumferential region, the middle region, and the outer circumferential region in the cross section were observed with a field-emission scanning electron microscope (JSM-7600F) at a magnification of 17000. The observation field of each region was 8.1 μm×5.7 μm in size. The width of the cementite and the distance between adjacent portions of the cementite were determined at 21 points from the image of each region using image analysis software (ImageJ). The average in each region and the average in all the regions were determined. The 21 points included 7 points in a portion with a narrow width or a short distance, 7 points in a portion with a wide width or a long distance, and 7 points in a portion with an intermediate width or an intermediate distance. Portions that were obviously not formed of pearlite were not measured. The average in all the regions was taken as the width of the cementite and as the distance between adjacent portions of the cementite in the sintered member of each sample.

The average width of the cementite in the inner circumferential region of the sintered member of the sample No. 1 was approximately 64 nm. The average width of the cementite in the middle region of the sintered member of the sample No. 1 was approximately 73 nm. The average width of the cementite in the outer circumferential region of the sintered member of the sample No. 1 was approximately 75 nm. The average width of the cementite in all the regions of the sintered member of the sample No. 1 was approximately 71 nm. The average distance between adjacent portions of the cementite in the inner circumferential region of the sintered member of the sample No. 1 was approximately 177 nm. The average distance between adjacent portions of the cementite in the middle region of the sintered member of the sample No. 1 was approximately 124 nm. The average distance between adjacent portions of the cementite in the outer circumferential region of the sintered member of the sample No. 1 was approximately 204 nm. The average distance between adjacent portions of the cementite in all the regions of the sintered member of the sample No. 1 was approximately 169 nm. Thus, the average width of the cementite in each of the inner circumferential region, the middle region, and the outer circumferential region of the sintered member of the sample No. 1 was 120 nm or less, and the average in all the regions was also 120 nm or less. The average distance between adjacent portions of the cementite in each of the inner circumferential region, the middle region, and the outer circumferential region of the sintered member of the sample No. 1 was 250 nm or less, and the average in all the regions was also 250 nm or less.

As in the sintered member of the sample No. 1, in the sintered member of the sample No. 2 or No. 3, the average width of the cementite in each of the inner circumferential region, the middle region, and the outer circumferential region and the average width of the cementite in all the regions satisfied 120 nm or less. Furthermore, as in the sintered member of the sample No. 1, in the sintered member of the sample No. 2 or No. 3, the average distance between adjacent portions of the cementite in each of the inner circumferential region, the middle region, and the outer circumferential region and the average distance between adjacent portions of the cementite in all the regions satisfied 250 nm or less.

The width of the cementite in the inner circumferential region of the sintered member of the sample No. 101 could not be measured. The average width of the cementite in the middle region of the sintered member of the sample No. 101 was approximately 134 nm. The average width of the cementite in the outer circumferential region of the sintered member of the sample No. 101 was approximately 145 nm. The average width of the cementite in each of the middle region and the outer circumferential region of the sintered member of the sample No. 101 was approximately 139 nm. The distance between adjacent portions of the cementite in the inner circumferential region of the sintered member of the sample No. 101 could not be measured. The average distance between adjacent portions of the cementite in the middle region of the sintered member of the sample No. 101 was approximately 292 nm. The average distance between adjacent portions of the cementite in the outer circumferential region of the sintered member of the sample No. 101 was approximately 309 nm. The average distance between adjacent portions of the cementite in each of the middle region and the outer circumferential region of the sintered member of the sample No. 101 was approximately 300 nm.

Test Example 2

Differences in strength of sintered members produced from raw powders with different compositions were examined.

[Samples No. 21 to No. 24 and No. 201]

Sintered members of samples No. 21 to No. 24 and No. 201 were produced in the same manner as in the samples No. 1 to No. 4 and No. 101 except that the raw powder contained an Fe—Ni—Mo ternary Fe alloy powder instead of pure iron and that the Cu powder content and the C powder content were changed. More specifically, the Cu powder content of the raw powder was 1.5% by mass, the C powder content was 0.5% by mass, and the Fe-4.0% by mass Ni-0.5% by mass Mo alloy powder content was the remainder. Table 3 lists the ambient temperature during sintering, the holding time at the ambient temperature, and the cooling rate in an ambient temperature range from a temperature at the start of cooling (the completion of sintering) to 200° C. Table 3 lists the heating rate in an ambient temperature range corresponding to the $A_1$ point to the $A_3$ point (700° C. to 900° C.) and the heating rate in an ambient temperature range corresponding to the $A_3$ point to the sintering temperature of the green compact (900° C. to 1135° C., 900° C. to 1185° C.), determined from the temperature profile of each sample as in the test example 1. Table 4 lists the apparent density and strength (radial crushing strength, Rockwell hardness) of the sintered member determined in the same manner as in the test example 1.

TABLE 3

| | | Sintering step | | | | | |
|---|---|---|---|---|---|---|---|
| | | Heating process Heating rate (° C./s) Ambient temperature range | | Sintering process | | | |
| Sample No. | Method, apparatus | Corresponding to $A_1$ point to $A_3$ point | Corresponding to $A_3$ point to sintering temperature | Ambient temperature sintering (° C.) | Holding time at ambient temperature | Cooling process Cooling rate (° C./s) | Cooling Temperature range |
| 21 | High-frequency induction heating | 12.5 | 4.8 | 1135 | 30 sec. | 1.0 | 1135° C. to 200° C. |
| 22 | High-frequency induction heating | 12.5 | 4.8 | 1135 | 60 sec. | 1.0 | 1135° C. to 200° C. |
| 23 | High-frequency induction heating | 12.5 | 4.8 | 1135 | 90 sec. | 1.0 | 1135° C. to 200° C. |
| 24 | High-frequency induction heating | 12.5 | 4.8 | 1185 | 30 sec. | 1.0 | 1185° C. to 200° C. |
| 201 | Continuous belt sintering | 0.70 | 0.70 | 1130 | about 16 min. | 0.61 | 1130° C. to 200° C. |

TABLE 4

| | | Strength | | |
|---|---|---|---|---|
| Sample No. | Apparent density (g/cm³) | Rockwell hardness HRB | | Radial crushing strength (MPa) |
| | | Upper end face | Lower end face | |
| 21 | 6.810 | 90.6 | 81.2 | 961.0 |
| | 6.836 | 88.8 | 81.3 | 961.8 |
| 22 | 6.825 | 85.6 | 82.1 | 994.7 |
| | 6.846 | 86.6 | 81.8 | 954.1 |
| 23 | 6.853 | 88.9 | 85.5 | 1142.8 |
| | 6.842 | 88.9 | 87.7 | 995.3 |
| 24 | 6.860 | 88.6 | 82.0 | 964.9 |
| | 6.841 | 88.2 | 81.2 | 945.7 |
| 201 | 6.809 | 83.3 | 80.0 | 916.1 |
| | 6.831 | 84.8 | 80.9 | 925.1 |

Table 4 shows that the apparent density of each sintered member of the samples No. 21 to No. 24 are almost the same as that of the sample No. 201. Thus, a sintered member with high dimensional accuracy can be produced by high-frequency induction heating from the raw powder containing the Fe alloy powder as well as from the raw powder containing the Fe powder.

Table 4 shows that the radial crushing strength and Rockwell hardness of each sintered member of the samples No. 21 to No. 24 are generally higher than those of the sample No. 201. Thus, a high-strength sintered member can be produced in a short time from the raw powder containing the Fe alloy powder as well as from the raw powder containing the Fe powder. In particular, a comparison between the samples No. 21 to No. 24 shows that for the raw powder containing the Fe alloy powder, unlike the raw powder containing the Fe powder, a longer holding time in the sintering process tends to result in higher strength. Thus, although not shown, the voids in each sintered member of the samples No. 21 to No. 24 had round edges and a few (almost no) sharp portions, as in the samples No. 1 to No. 4.

Test Example 3

The strength of a sintered member produced by maintaining a particular ambient temperature in the heating process was evaluated.

[Samples No. 31, No. 32, and No. 301]

A sintered member of each of samples No. 31, No. 32, and No. 301 was produced in the same manner as in the sample No. 1 except that the ambient temperature of 400° C., 500° C., or 300° C. was maintained for 30 seconds in the heating process. The dry density, dimensional accuracy, and strength were examined in the same manner as in the sample No. 1. Table 5 shows the results.

TABLE 5

| | | Dimensional accuracy | | | | | | Strength | | |
|---|---|---|---|---|---|---|---|---|---|---|
| | Apparent | Rate of change(%) | | | | | Sphericity(mm) | | Rockwell hardness HRB | Radial crushing |
| Sample No. | density (g/cm³) | Outer diameter | | Inner diameter | | Height | Outer diameter | Inner diameter | | strength (MPa) |
| | | X-axis | Y-axis | X-axis | Y-axis | | | | Upper end face / Lower end face | |
| 31 | 6.775 | 0.229 | 0.263 | 0.230 | 0.284 | 0.443 | 0.005 | 0.005 | 74.2 / 70.2 | 903.1 |
| 32 | 6.768 | 0.211 | 0.269 | 0.126 | 0.274 | 0.005 | 0.009 | 0.015 | 78.9 / 68.5 | 926.7 |
| 301 | 6.774 | 0.302 | 0.139 | 0.388 | 0.057 | 0.105 | 0.029 | 0.034 | 75.8 / 66.4 | 844.6 |

Table 5 shows that the samples No. 31 and No. 32 had higher radial crushing strength than the samples No. 301 and No. 101 (see Table 2). Thus, even if an ambient temperature of 400° C. or 500° C. was maintained in the heating process, a high-strength sintered member could be produced in a shorter time than the production with a continuous belt sintering furnace.

The present invention is defined by the appended claims rather than by these embodiments. All modifications that fall within the scope of the claims and the equivalents thereof are intended to be embraced by the claims.

The invention claimed is:

1. A sintered member with a composition including an Fe alloy containing C, wherein
   a C powder content of raw powder from which the sintered member is formed is 0.2% or more by mass and 1.2% or less by mass of the raw powder, and
   voids in a cross section of the sintered member have a sphericity of 50% or more and 85% or less, the sphericity being represented by [{area of void/(perimeter of void)$^2$}/0.0796]×100.

2. The sintered member according to claim 1, wherein the composition further contains Cu, and
   an area analysis of a cross section of the sintered member with an electron probe microanalyzer at an accelerating voltage of 15 kV, at a beam current of 100 nA, and at a beam diameter of 0.1 μm for an analysis time of 3 hours shows that a ratio (α/β)×100 is 40% or more, wherein α denotes a total area of a region with a Cu concentration level of 0.4 or more and 0.65 or less times a maximum Cu concentration level, and β denotes a total area of a region with a Cu concentration level of 0.16 or more times the maximum Cu concentration level.

3. A method for producing the sintered member of claim 1, comprising the steps of:
   preparing a raw powder containing an Fe powder or an Fe alloy powder and containing a C powder;
   press-forming the raw powder to produce a green compact; and
   sintering the green compact by high-frequency induction heating,
   wherein the C powder content of the raw powder is 0.2% or more by mass and 1.2% or less by mass, and
   a temperature of the green compact in the step of sintering the green compact is controlled to satisfy all the following conditions (I) to (III):
   (I) the temperature is increased without maintaining the temperature in a temperature range equal to or higher than an $A_1$ point of an Fe—C phase diagram and lower than the sintering temperature of the green compact,
   (II) a heating rate is set to 12° C./s or more in a temperature range of the $A_1$ point to an $A_3$ point of the Fe—C phase diagram, and
   (III) a heating rate is set to 4° C./s or more in a temperature range of the $A_3$ point of the Fe—C phase diagram to the sintering temperature of the green compact.

4. The method for producing a sintered member according to claim 3, wherein the raw powder further contains 0.1% or more by mass and 3.0% or less by mass Cu powder.

5. The method for producing a sintered member according to claim 3, wherein a holding time at the sintering temperature of the green compact is 30 seconds or more and 90 seconds or less.

6. The method for producing a sintered member according to claim 3, wherein an ambient temperature during sintering of the green compact is 1135° C. or more and less than 1250° C.

7. The method for producing a sintered member according to claim 3, wherein a heating rate is set to 12° C./s or more in an ambient temperature range of 400° C. or more and less than 700° C. without maintaining the ambient temperature in a heating process in the step of sintering the green compact.

8. The method for producing a sintered member according to claim 3, wherein an ambient temperature of 400° C. or more and less than 700° C. is maintained for 30 seconds or more and 90 seconds or less in a heating process in the step of sintering the green compact.

9. The method for producing a sintered member according to claim 3, wherein a cooling rate in a cooling process in the step of sintering the green compact is 1° C./s or more.

10. A sintered member with a composition including an Fe alloy containing C, wherein
    voids in a cross section of the sintered member have a sphericity of 50% or more and 85% or less, the sphericity being represented by [{area of void/(perimeter of void)$^2$}/0.0796]×100,
    the sintered member has a pearlite structure in which cementite and ferrite are layered,
    the cementite has a width of 120 nm or less, and
    a distance between adjacent portions of the cementite is 250 nm or less.

11. A sintered member with a composition including an Fe alloy containing C, wherein
    voids in a cross section of the sintered member have a sphericity of 50% or more and 85% or less, the sphericity being represented by [{area of void/(perimeter of void)$^2$}/0.0796]×100,
    the sintered member has a pearlite structure in which cementite and ferrite are layered,
    the composition further contains Cu,
    an area analysis of a cross section of the sintered member with an electron probe microanalyzer at an accelerating voltage of 15 kV, at a beam current of 100 nA, and at a beam diameter of 0.1 μm for an analysis time of 3 hours shows that a ratio (α/β)×100 is 40% or more, wherein α denotes a total area of a region with a Cu concentration level of 0.4 or more and 0.65 or less times a maximum Cu concentration level, and β denotes a total area of a region with a Cu concentration level of 0.16 or more times the maximum Cu concentration level,
    the cementite has a width of 120 nm or less, and
    a distance between adjacent portions of the cementite is 250 nm or less.

* * * * *